(12) United States Patent
Wilson et al.

(10) Patent No.: US 7,203,576 B1
(45) Date of Patent: Apr. 10, 2007

(54) MOISTURE SENSOR TIMER

(75) Inventors: Chadwick L. Wilson, Woods Cross, UT (US); Christian M. Olsen, Bountiful, UT (US)

(73) Assignee: Orbit Irrigation Products, Inc., Bountiful, UT (US)

( * ) Notice: Subject to any disclaimer, the term of this patent is extended or adjusted under 35 U.S.C. 154(b) by 29 days.

(21) Appl. No.: 11/053,647

(22) Filed: Feb. 8, 2005

Related U.S. Application Data

(60) Provisional application No. 60/543,465, filed on Feb. 9, 2004.

(51) Int. Cl.
  G05B 11/01 (2006.01)
  B05B 17/00 (2006.01)
  B05B 12/08 (2006.01)

(52) U.S. Cl. .................. 700/284; 405/52; 137/78.3; 239/63

(58) Field of Classification Search ................ 700/284; 405/52; 137/78.3; 239/63
  See application file for complete search history.

(56) References Cited

U.S. PATENT DOCUMENTS

| | | | |
|---|---|---|---|
| 4,934,400 A | 6/1990 | Cuming | |
| 4,993,640 A | 2/1991 | Baugh | |
| 5,038,268 A * | 8/1991 | Krause et al. ............... | 700/16 |
| 5,262,936 A | 11/1993 | Faris et al. | |
| 5,847,568 A | 12/1998 | Stashkiw et al. | |
| 6,236,907 B1 * | 5/2001 | Hauwiller et al. .......... | 700/283 |
| 6,314,340 B1 * | 11/2001 | Mecham et al. ............ | 700/284 |
| 6,490,505 B1 | 12/2002 | Simon et al. | |
| 6,618,673 B2 * | 9/2003 | Zur ............................... | 702/2 |
| 6,663,012 B2 * | 12/2003 | Condreva .................... | 239/63 |
| 6,782,311 B2 | 8/2004 | Barlow et al. | |
| 6,895,987 B2 * | 5/2005 | Addink et al. ............. | 137/78.3 |
| 7,063,270 B2 * | 6/2006 | Bowers et al. ................. | 239/1 |
| 7,133,749 B2 * | 11/2006 | Goldberg et al. ........... | 700/284 |
| 2002/0002425 A1 | 1/2002 | Dossey et al. | |
| 2004/0013468 A1 | 1/2004 | Kadner et al. | |
| 2004/0030456 A1 | 2/2004 | Barlow et al. | |
| 2005/0240313 A1 * | 10/2005 | Cartwright .................. | 700/284 |

OTHER PUBLICATIONS

"Irrigation System Controllers" -Zazueta et al, University of Florida Institute of Food and Agricultural Sciences. SS-AGE-22, Mar. 1993.*
"Irrigation System Controllers" -Zazueta et al, University of Florida Institute of Food and Agricultural Sciences, Jul. 1994.*
"Turf Irrigation for the Home" -Zazueta et al, University of Florida Intstitute of Food and Agricutural Sciences, Apr. 1995.*
"Improved Irrigation Management Through Soil Moisture Monitoring" -Orloff et al, UC Cooperative Extension, Dec. 1998.*

* cited by examiner

Primary Examiner—Michael D. Masinick
(74) Attorney, Agent, or Firm—Madson & Austin

(57) ABSTRACT

A timer that facilitates a user's scheduling and controlling of the operation of an irrigation system for irrigating a property, the timer including a base unit electrically connected to the valve, and a handheld unit including a power source, a CPU, a valve controller, a memory device, and software stored in the memory device. The irrigation system includes a valve, a conduit, and a distribution unit that distributes fluid over an irrigation zone of the property. The handheld unit is used remotely from the base unit to modify an irrigation schedule of the valve. The irrigation schedule is used with the valve controller to operate the valve according to the irrigation schedule through communication with the base unit.

6 Claims, 11 Drawing Sheets

MOISTURE SENSOR TIMER

CROSS-REFERENCED RELATED APPLICATIONS

This application claims the benefit of U.S. Provisional Application No. 60/543,465, filed Feb. 9, 2004 entitled ENHANCED IRRIGATION TIMER by Chadwick L. Wilson and Christian M. Olsen, which is incorporated herein by reference.

BACKGROUND OF THE INVENTION

The present invention relates to timers for controlling the operation of irrigation systems. More specifically, the present invention relates to an improved timer and a method of using a timer to control an irrigation system.

Water conservation is an area of growing concern in today's society. As the population grows, the demand for and consumption of water also increases. The increasing demands for water and occasional droughts have resulted in water shortages. In response to water shortages, many state and local governments have issued guidelines and regulations regarding water consumption in order to promote the conservation and efficient use of available water supplies. Such regulations and guidelines often relate to the amount of water that may be used for certain activities, such as for irrigation, as well as penalties for excessive water usage. Additionally, such regulations and guidelines may also provide for fines for watering during daylight hours or wasting water that may result from improper maintenance of an irrigation system Landscape irrigation accounts for a large percentage of the water that is used by businesses and individuals such as homeowners. Unfortunately, studies have shown that homeowners consistently apply to their property at least twice as much water as is actually required for healthy growth. This results in the inefficient use of available water supplies, as well as water bills that are unnecessarily high.

Conversely, property owners may apply too little water to their property, which results in dry areas of their property with dead or weak plants that are more susceptible to weeds and pests. These dry areas can be unattractive and affect the value and desirability of the property. In reaction, property owners may over react and apply too much water.

One reason that many property owners commonly overwater or under-water their property is that such property owners are often unaware of the actual irrigation needs of their particular property. For example, how often a lawn is mowed, fertilized, or treated with pesticides and herbicides can affect the irrigation requirements of the lawn. Also, the amount of sunlight that each irrigation zone associated with an irrigation system receives can dramatically affect the irrigation requirements of different irrigation zones on their property. Additionally, given the wide range of plant and soil types, many property owners do not have the knowledge or the resources to determine the irrigation requirements of their property.

Instead, homeowners often prefer the convenience of attaching a controller or timer switch to their irrigation system. Irrigation timers are used to control the delivery of water to sprinkler heads, drip lines, etc. Most irrigation timers are set up to deliver water to sets of sprinklers in different irrigation zones to ensure that the sprinklers are provided with adequate water pressure. This also permits the different irrigation zones to be watered for different periods of time at different frequencies and at different times of day.

Irrigation timers determine when and for how long water is delivered to each set of sprinklers and actuate the irrigation valves in a predetermined or selected sequence to accomplish this. A typical timer switch opens the sprinkler valves for a specific amount of time on certain days of a week according to an irrigation schedule.

While such timers may be convenient, they are also inefficient in that they deliver water based only upon the time of day, regardless of the condition and actual requirements of their property. Conventional timers are also unable to make adjustments to irrigation when yard care takes place that may affect the irrigation requirements of the property. Hence, the use of a timer often results in the over-watering of a lawn or garden.

One of the problems with conventional timers is that they rely on a combination of sliding or rotating switches, push buttons, and lighted displays to perform and verify various functions, including setting the time of day, when to water, how long to water, etc. These conventional systems often rely on some type of common readout or display and the use of multifunction buttons, switches or other user inputs. The way conventional timers are designed, especially the use of multifunction user inputs, reduces the ease of use for the owner. This is especially true because after first being programmed, programming may not be necessary again for six months; because programming conventional irrigation timers is not necessarily intuitive, the user often needs to find and then re-review the instruction manual to ensure that programming is done properly.

Additionally, problems with the irrigation system may arise such as clogged distribution units, broken conduits, or broken distribution units. Currently available timers are unable to clearly direct property owners or caretakers to these problems. As a result, a user may waste hours, just trying to locate the problem. Compounding the problem of wasted time is the location of currently available timers, which are typically fixed to a structure. The fixed location of the timer may require the user to waste additional time and energy in running back and forth to the timer from various locations on the property in order to discover the precise location of a problem and make repairs to the irrigation system.

Currently available timers are also unable to interact with sensors and other systems, such as security systems, to actuate irrigation at a time not in accordance with the preset irrigation schedule. For example, a common problem that plagues many property owners are dogs and cats relieving themselves on the property. Currently, the only remedy is a caretaker chasing away such animals, which is inefficient, time consuming, and ultimately unsuccessful at changing the behavior of the animal.

Accordingly, a need exists for a timer which is highly responsive to the irrigation requirements for various plant and soil types. A need exists for a timer that provides mobile control to a user and that simplifies controlling and scheduling an irrigation system. Furthermore, a need exists for a timer that facilitates the locating and repair of an irrigation system. Additionally, a need exists for a timer that can interact with and support the operation of a fertilizer storage device or a home security system.

BRIEF SUMMARY OF THE INVENTION

The present invention has been developed in response to the present state of the art, and in particular, in response to the problems and needs in the art that have not yet been fully solved by currently available timers. The timer of the invention facilitates a user's scheduling and controlling of the operation of an irrigation system disposed on a property. The irrigation system may include at least a valve, a conduit, and a distribution unit. The distribution unit distributes fluid over an irrigation zone, which is an area of the property. Alternatively, the irrigation system may provide a plurality of irrigation zones; with a plurality of distribution units distributing fluid over each irrigation zone.

The distribution units of an irrigation zone may be controlled by a single valve or by multiple valves. Irrigation of an irrigation zone is controlled by a timer that operates the valve or valves of the irrigation system that associated with the irrigation zone to distribute water over the irrigation zone through the distribution units according to an irrigation schedule.

A method according to the invention for using a timer to control the operation of an irrigation system on a property includes a screen that displays irrigation information and a memory device for retaining an irrigation schedule. The method may include the steps of generating a map of the property on the screen of the timer or a computer, determining the shape of the irrigation zone, displaying the irrigation zone on the map, and determining the irrigation schedule for the irrigation zone. In determining the shape of the irrigation zone, the shape of the irrigation zone may be input by hand into the timer or input using a satellite receiver used to receive position data from global positioning satellites. If the shape of the irrigation zone is input by hand, the method may include the steps of selecting an icon generally having the shape of the irrigation zone and disposing the icon on the map. Alternatively, if the screen of the timer is a touch screen, a user may draw the irrigation zone on the map using a stylus.

The method may also include the steps of displaying the property boundary lines on the map in relation to the irrigation zone, displaying the distribution units and associated conduits on the map, and displaying a structure on the map. The property boundary lines may be obtained from the internet, input by hand, or input using the satellite receiver used to receive position data from global positioning satellites. Each distribution unit and conduit displayed on the map may be associated with information regarding its type, capability, and physical characteristics. The structure may be a side walk, a driveway, a home, an office building, a fire hydrant, etc.

Alternatively, the map could be generated and defined on a computer and downloaded from the computer to the timer. The map may be created using software on the user's computer, an internet site, or from a kiosk in a store. The timer may also download the map from the store kiosk.

If the timer includes a satellite receiver for communicating with global positioning satellites to receive position data, the position data may be used to determine a location on the map, which may be used to determine the shape, size, and area of the irrigation zone, the property boundaries, and the structures. The position data may also be used to locate each distribution unit of the irrigation system and also to determine the shape, area and location of a portion of the property that is generally populated with a certain plant type. For example, a timer that includes a satellite receiver may be physically moved around the property to obtain position data for the property. The position data can then be used to generate the features of the map such as the property boundaries, the shape, location, and area of irrigation zones, the location of distribution units, and the location and shape of particular areas of the property generally populated with plant type, such as a rose garden or Kentucky blue grass. The position data may be used to improve and better define the map and the relationship of the various map elements displayed on the map.

The timer may also be in communication with a sensor so that the method further includes the steps of using the sensor to determine the amount of water distributed to the irrigation zone over time and determining a desired water coverage of an irrigation zone. For example, a user may input information regarding the type plant that generally populates an irrigation zone. A user may do this by selecting general plant types from a menu or specifically enter a generic name or scientific name for the plant type.

The plant type can be used to obtain information from a database of plant information stored in the memory device or obtained from a database on the internet. The information may include water requirements for that type of plant, as well as other information about pruning, fertilizing, controlling pests, and using herbicides that are appropriate for maintaining the health of that type of plant. The information may also include the suggested amount of sunlight, slope of the property to grow on, and type of soil for that type of plant. The information may also be related to the location of the irrigation system by providing information that is related to the geographic conditions of the area in which the property is situated.

The method may also include the steps of determining a soil type of the property and inputting the soil type of the irrigation zone in the memory device. The user may also input the general amount of sunlight the irrigation zone receives during an average day. Using this information, the timer may better determine the desired water coverage for the irrigation zone. By determining the desired water coverage and the amount of water distributed to the irrigation zone over time, the irrigation schedule for the irrigation zone may then be more precisely determined to better provide for the irrigation needs of the irrigation zone without overwatering.

Where the irrigation system distributes water to a plurality of irrigation zones, the method may further include assigning a unique indicator that is used to indicate the area of each irrigation zone on the map. A property may also include a plurality of microclimates, such as the north side of building that receives little direct sunlight or an area of the property that is generally populated with rose bushes or a garden. Microclimate information may include the amount of sunlight an area receives, the soil type in an area of the property, the plant type that generally populates an area of the property, the slope of an area of the property, etc. Therefore, the method may also include the step of assigning a unique indicator to a microclimate to indicate the area of the microclimate on the map.

One embodiment of a timer according to the invention may include a base unit that is electrically connected to the valve and may include a retention portion. The timer may also include a handheld unit having a power source, a CPU, a memory device, and software stored in the memory device. A user may use the handheld unit remotely from the base unit to control the operation of the irrigation system through communication with the base unit.

Where the base unit includes a retention portion, the base unit receives the handheld unit such that the retention portion may secure the handheld unit to the base unit. While the user uses the handheld unit remotely from the base unit, the user's input may be stored in the memory device of the handheld unit so that when the handheld unit is secured to the base unit, the handheld unit communicates with the base unit. Alternatively, while the user uses the handheld unit remotely from the base unit, the handheld unit is in communication with the base unit through a radio frequency transmitter or other communication device known in the art.

The handheld unit may also include a screen and a satellite receiver for communicating with global positioning satellites to receive position data. The position data may be used to facilitate the user's control of the irrigation system or used to determine information about the irrigation system. For example, the position data may be used to locate portions of the irrigation system, as well as determine the position of an area of the property in relation to the irrigation zone. As noted above, the timer may provide a map that displays the irrigation zone of the irrigation system, a property boundary, and any structures located on the property.

The timer may be in communication with a variety of sensors. For example, the timer may be in communication with an irrigation system sensor, such as a pressure sensor or a flow sensor, so that the timer may monitor the condition of the irrigation system. For example, a pressure sensor that verifies that there is sufficient pressure in the irrigation conduit to provide irrigation to an irrigation zone. Alternatively, the timer may directly monitor the impedance of each valve to determine the condition of the valve of the irrigation system. The timer may also indicate the condition of the irrigation system on the map.

The timer may be in communication with a flow sensor that determines the amount of water distributed to an irrigation zone. The timer may use the flow sensor or another type of sensor known in the art to measure the amount of water distributed to an irrigation zone over time. The timer may also store the area of the irrigation zone and the desired irrigation fluid coverage of the irrigation zone in memory. The timer may include software that uses the amount of water distributed to the irrigation zone over time, the desired irrigation fluid coverage of the irrigation zone, and the area of the irrigation zone to automatically determine an irrigation schedule for the irrigation zone without further user input.

For example, if 0.1 cubic meters of irrigation fluid per minute is distributed over the irrigation zone and the irrigation zone is 10 square meters in area, 0.01 meters of irrigation fluid per minute is distributed over the irrigation zone. If the desired amount of irrigation fluid coverage of the irrigation zone is 0.05 meters per day, the software will irrigate the irrigation zone for 5 minutes each day. The desired amount of irrigation fluid coverage may be determined by the general plant type populating the irrigation zone, the condition of the plants, the type of soil in the irrigation zone, the amount of sunlight the irrigation zone receives, and the weather. Other factors may also be considered to determine the desired irrigation fluid coverage of the irrigation zone.

Alternatively, the timer may be in communication with environmental sensors so that the timer uses input from the environmental sensors to determine or modify an irrigation schedule to meet the irrigation requirements of the property. For example, the timer may be in communication with a light intensity sensor so that on sunny days, more irrigation is provided than on cloudy days. Environmental sensors may also include temperature sensors, humidity sensors, rain fall sensors, soil moisture sensors, and other sensors known in the art.

The timer may also be in communication with sensors so that the timer causes the distribution of fluid to the irrigation zone in response to the sensor information. Specifically, the timer may be in communication with the sensors of a security system so that in response to certain sensor input from the security system, the timer actuates the irrigation system to provide the distribution of fluid to one or more irrigation zones in response to the sensor information. This may be particularly useful in encouraging trespassers to find another route off of the property or encouraging animals to take their business elsewhere. For example, the timer may be in communication with a motion detector or an infrared laser so that when a trespasser is detected in an irrigation zone, the timer opens the valves to the distribution units associated with the irrigation zone to irrigate the area for a short period of time.

A user may also input irrigation exclusion dates into the timer so that on the selected dates, irrigation is altered or does not occur. For example, the fourth of July may be selected as an exclusion date because the property owner may have friends and family over using the property that night. The timer may also adjust the irrigation of the irrigation zones to accommodate the irrigation exclusion dates so that the plants on the property are not harmed.

The timer may also include software that provides yard care suggestions in response to user input. Yard care suggestions may include when and how to cut a lawn, prune a bush or tree, apply fertilizer, apply pest control, and other yard care details. User input may include; the day the lawn was cut, how low the lawn was cut, and the type, location, and amount of fertilizer applied to the property or a specific irrigation zone. Yard care suggestions may also include suggestions on what type of plants may be suitable for a specific location of the property. Additionally, the yard care suggestions may include suggested courses of action in response to plant symptoms that are input by a user. For example, the user may input that an area of an irrigation zone containing a cherry tree that has curling leaves. The yard care suggestions in response to the user input may provide a possible diagnosis of the cause of the symptom as well as suggested regimen of insecticides and fertilizers.

The timer of the invention may also communicate with a fertilizer unit connected to the irrigation system so that the timer can actuate the fertilizer unit to provide "fertigation." Fertigation is the use of the irrigation system to distribute fertilizer, herbicide, or insecticide over the property.

This embodiment of the timer may be used with a method according to the invention to control the operation of an irrigation system on a property. The method may include the steps of removing the handheld unit from the base unit, transporting the handheld unit to a location remote from the base unit, modifying the irrigation schedule of the irrigation zone with the handheld unit from the location, and securing the handheld unit to the base unit. While the handheld unit is remote from the base unit, the method may also include one of the steps of inputting yard care information in the memory device of the handheld unit, displaying yard care suggestions on the screen of the handheld unit, or inputting irrigation exclusion dates into the handheld unit so that the irrigation schedule is modified by the irrigation exclusion dates. The method may include the steps of displaying a map of the property and the irrigation zone and selecting the irrigation zone on the map to review the operation of the irrigation zone.

Where the timer includes a satellite receiver for communicating with global positioning satellites to receive position data, the method may include the steps of using the position data to determine the location of a portion of the irrigation system while the handheld unit is remote from the base unit. Where the timer comprises a plurality of distribution units and a plurality of irrigation zones, the method may include the step of using the handheld unit remotely from the base unit to determine which distribution unit distributes water to which irrigation zone.

These and other features of the present invention will become more fully apparent from the following description, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 13, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single work piece.

Figure 1:
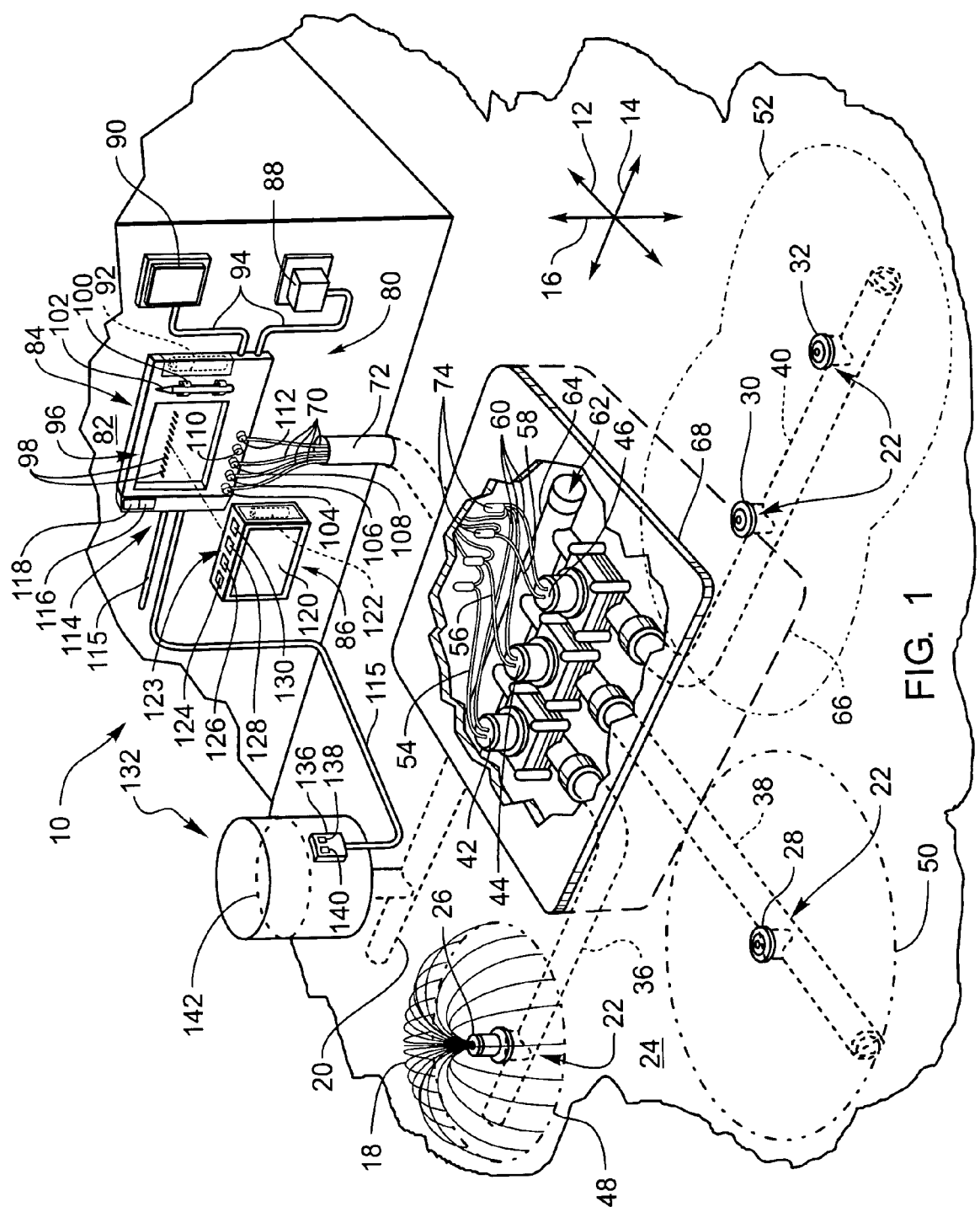
FIG. 1 is a perspective view of a portion of an irrigation system according to one embodiment of the invention, showing the lid of the manifold box partially cut away to reveal valves connected to the enhanced irrigation timer, wherein the timer is illustrated in exploded form with a handheld unit removed from the base unit.

Referring to FIG. 1, a perspective view depicts an irrigation system 10 according to one embodiment of the invention. The irrigation system 10 has a longitudinal direction 12, a lateral direction 14, and a transverse direction 16.

The irrigation system 10 is designed to receive an irrigation fluid 18, such as water, via a main line 20. "Irrigation fluid" refers to any liquid that can be used to promote plant growth. Thus, the irrigation fluid 18 need not be only water, but may, for example, include fertilizers, pesticides, or other additives.

The irrigation system 10 distributes the irrigation fluid 18 through a plurality of distribution units 22 over an area of a property 24 that is designated for plant growth. A "distribution unit" encompasses a variety of devices used to spread water, such as pop-up sprinkler heads, rotary sprinklers, bubblers, drip irrigation systems, and the like. The irrigation system 10 includes distribution units 22 in the form of a first sprinkler head 26, a second sprinkler head 28, a third sprinkler head 30, and a fourth sprinkler head 32.

The first and second sprinkler heads 26 and 28 are supplied with irrigation fluid 18 by first and second distribution conduits 36 and 38 respectively. The third and fourth sprinkler heads 30 and 32 are supplied with irrigation fluid 18 by a third distribution conduit 40. Each of the distribution conduits 36, 38, and 40 may extend further to supply additional water distribution units (not shown). In this application, a "conduit" is any structure capable of conducting a fluid under pressure from one location to another.

Irrigation fluid 18 distribution from the main line 20 to the first, second, and third distribution conduits 36, 38, and 40 is controlled by a first valve 42, a second valve 44, and a third valve 46, respectively. Each of the valves 42, 44, and 46 has a closed configuration, in which water flow is blocked, and an open configuration, in which water flow is permitted. The valves 42, 44, and 46 may optionally operate to permit water flow to only one of the conduits 36, 38, and 40 at any given time, so that each conduit 36, 38, or 40, in turn, receives the full pressure and flow rate of irrigation fluid 18 from the main line 20.

As depicted in FIG. 1, the first valve 42 is in the open configuration to supply irrigation fluid 18 to the first sprinkler head 26 via the first conduit 36. The second and third valves 44 and 46 are in the closed configuration so no significant amount of irrigation fluid 18 flows into the second and third conduits 38 and 40 and the second and third sprinkler heads 28 and 30 are inactive.

Also shown in FIG. 1, the first and second sprinkler heads 26 and 28 distribute irrigation fluid 18 to a first irrigation zone 48 and a second irrigation zone 50 of the property 24, respectively. The third and fourth sprinkler heads 30 and 32 distribute water over a third irrigation zone 52.

The valves 42, 44, and 46 include a first valve wire 54, a second valve wire 56, and a third valve wire 58, respectively. The valves 42, 44, and 46 also include ground wires 60.

The valve assemblies 42, 44, and 46 are interconnected by a manifold 62, to which the main line 20 is attached. More precisely, the manifold 62 includes a feeder conduit 64 that receives irrigation fluid 18 from the main line 20 at one end. The valve assemblies 42, 44, and 46 are arranged generally perpendicular to the feeder conduit 64 to receive the irrigation fluid 18. The manifold 62 and the valves 42, 44, and 46 are disposed within a valve box 66, which may be disposed generally underground, as depicted. The valve box 66 has a lid 68 designed to provide access to the manifold 62 for repair or maintenance.

A plurality of control unit wires 70 are connected to valve wires 54, 56, and 58 and the ground wires 60. Except at the ends, the control unit wires 70 are covered by a sheath 72 designed to gather and protect the control wires 70. As depicted, the valve wires 54, 56, and 58 are connected to the control unit wires 70 via conventional wire nuts 74. The control unit wires 70 extend from the valve wires 54, 56, and 58 and ground wires 60 to a timer 80 designed to transmit valve activation signals through the control wires 70. If desired, the control wires 70 may alternatively be coupled to the valve wires 54, 56, and 58 via some type of electrical junction unit (not shown).

A timer 80 transmits the valve activation signals via the control unit wires 70 according to an irrigation schedule. The timer 80 may be attached to a wall 82 near the valve box 66, as shown, or may be disposed at a remote location. As illustrated in FIG. 1, the timer 80 includes a base unit 84 fixedly attached to the wall 82 and a handheld unit 86 removably attachable to the base unit 84. The timer 80 may be positioned indoors or outdoors. Removable color plates or the like may be used to adapt the appearance of the timer 80 to suit its surroundings and/or conceal it effectively. The handheld unit 86 may be removed by a user to facilitate use, in a manner that will be described below.

The base unit 84 may be coupled to a power source, such as a conventional power outlet, through the use of an AC adapter 88. The timer 80 may be designed to operate with 100 or 220 volt standards, and may include a switch (not shown) for manual voltage selection, or circuitry designed to automatically utilize either voltage. In the alternative to or in addition to the AC adapter 88, the base unit 84 may be coupled to a solar cell 90 designed to convert sunlight into electrical energy. The base unit 84 may also include a battery 92 that may be recharged by the AC adapter 88 or the solar cell 90 for use during power outages at night. The AC adapter 88 and the solar cell 90 are connected to the base unit 84 by wires 94.

The base unit 84 has a receiving alcove 96 in which the handheld unit 86 seats. The receiving alcove 96 has a plurality of retention portions 98 that are insertable into corresponding openings (not shown) in the back side of the handheld unit 86 to provide electrical coupling between the base unit 84 and the handheld unit 86 and to attach the handheld unit 86 to the base unit 84.

The base unit 84 also has a plurality of stylus grips 100 designed to retain a stylus 102 that can be used in conjunction with the handheld unit 86. The base unit 84 has a first valve control terminal 104, a second valve control terminal 106, a third valve control terminal 108, a fourth valve control terminal 110 and a ground terminal 112. Each of the valve control terminals 104, 106, 108, and 110 and the ground terminal 112 may take the form of a screw or other contact. Alternatively, each valve control terminal 104, 106, 108, and 110 and ground terminal 112 may be a different type of electrical interface such as a jack into which a plug can be inserted to provide an electrical connection.

The first, second, and third valve control terminals 104, 106, 108 are connected to the first, second, and third valve assemblies 42, 44, and 46 via the first, second, and third valve wires 54, 56, and 58, as shown in FIG. 1. The fourth valve control terminal 110 is open in FIG. 1, and may be coupled to a fourth valve assembly (not shown). Thus, the timer 80 may accommodate from one to four valves. Four valve control terminals 104, 106, 108, and 110 are provided merely by way of example. In alternative embodiments, any number of valves may be accommodated.

The base unit 84 also has a data port 114 that may be used to transfer data between a wide variety of wired devices, the handheld unit 86, and the base unit 84. The data port 114 may include a variety of communication devices such as the retention portions 98 of the base unit 84. The data port 114 may include a telephone jack or network cable jack designed to receive a corresponding telephone or computer network connector, such as a Category 5 connector. The data port 114 may alternatively be designed to receive other connector types such as USB 1, USB 2, IEEE 1394 ("Firewire"), serial, parallel, and coaxial connectors. The data port 114 may optionally be designed primarily for digital data transmission. As shown, a data line 115 is connected to the data port 114, and is also connected to one or more external devices (not shown) that are to communicate with the timer 80. The data port 114 may also include an infrared ("IR") transmitter/receiver 116 and a radio frequency ("RF") transmitter/receiver 118 for communicating with external devices. Some examples of such devices will be illustrated schematically in FIG. 2.

The handheld unit 86 has a touch screen 120 that displays information and enables a user to easily control operation of the timer 80. The touch screen 120 may be of a type currently found in PDA's (personal digital assistants), certain computers, and the like. The user may thus use the stylus 102 in conjunction with the touch screen 120 to easily manipulate the various functions of the timer 80. The touch screen 120 may be backlit to enable operation in darker environments.

The handheld unit 86 also has a battery 122 that provides electrical power to the handheld unit 86 regardless of whether the handheld unit 86 is coupled to the base unit 84. The battery 122 may be rechargeable, and may be charged when the handheld unit 86 is connected, or "docked," with the base unit 84. The battery 122 then receives power from the AC adapter 88, the solar cell 90, and/or the battery 92.

The handheld unit 86 may also include communications hardware 123, such as an IR transmitter/receiver 124, a RF transmitter/receiver 126, a satellite receiver 128, and a network interface card ("NIC") 130, which will be described in greater detail below.

A fertilizer storage unit 132 may be connected to the main line 20 and thus, the irrigation system 10. The base unit 84 of the timer 80 may be electrically connected to the fertilizer storage unit 132 by a data line 115 extending from the data port 114 to a communication device 136 of the fertilizer storage unit 132. Alternatively, the communication device 136 of the fertilizer storage unit 132 may include an IR transmitter/receiver 138 or a RF transmitter/receiver 140.

The timer 80 may be used to initiate fertilization through the irrigation system 10 by actuating the fertilizer storage unit 132 to mix fertilizer 142 into the main line 20. As the fertilizer 142 is mixed into the irrigation fluid 18, the irrigation system 10 is used to provide "fertigation," or fertilization combined with irrigation. As the valve assemblies 42, 44, and 46 are opened and closed the respective first, second, and third irrigation zones 48, 50, and 52 receives fertigation. The timing, duration, and other parameters of fertigation may be automatically determined by the timer 80. The handheld unit 86 also has a variety of internal components that will be shown schematically in FIG. 2.

Figure 2:
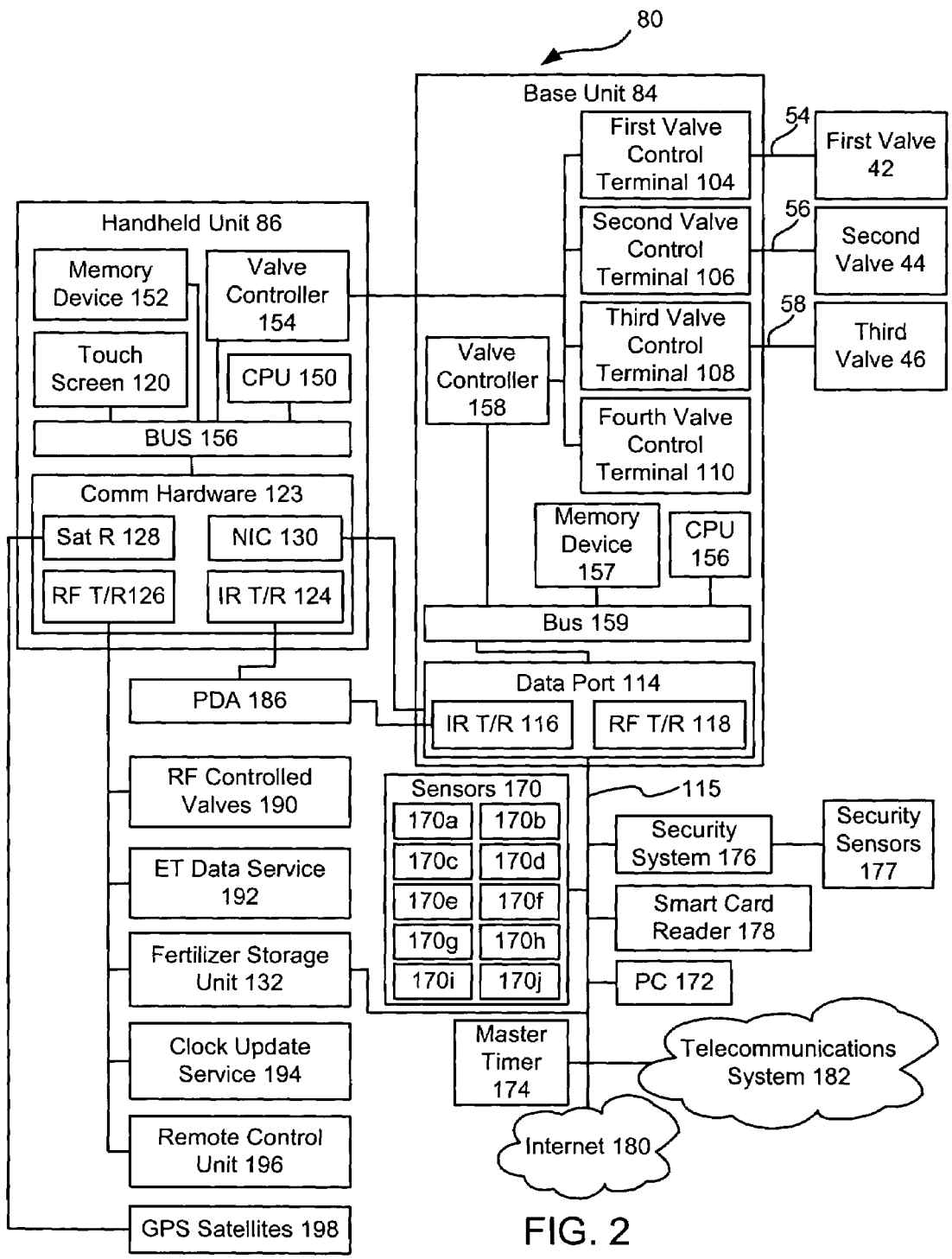
FIG. 2 is a schematic block diagram of the electrically coupled components of the irrigation system of FIG. 1, with other optional components added by way of example.

Referring to FIG. 2, a schematic block diagram illustrates the electrically connected components of the irrigation system 10 of FIG. 1, along with a variety of optional components. As shown, the handheld unit 86 includes a CPU 150, a memory device 152, communications hardware 123, and may include a valve controller 154, which are electrically coupled to each other and to the touch screen 120 via a bus 156. The bus 156 may digitally connect the various components 120, 123, 150, 152, and 154 of the handheld unit 86 together.

The base unit 84 which will be discussed in more detail below includes the first, second, third, and fourth valve control terminals 104, 106, 108, and 110 and the data port 114. In other embodiments, the base unit 84 may also include a CPU 156, a memory device 157, a valve controller 158, and a bus 159. The bus 159 electrically couples the first, second, third, and fourth valve control terminals 104, 106, 108, and 110, the data port 114, the CPU 156, the memory device 157, and the valve controller 158 together. The data port 114 may also include an IR transmitter/receiver 116 or a RF transmitter/receiver 118.

The CPU 156 of the base unit 84 and the CPU 150 of the handheld unit 86 may be any of a variety of known types, including microprocessors, application-specific integrated circuits (ASICs), field-programmable gate arrays (FPGAs), and the like. The memory devices 152 and 157 may be designed to store data regardless of whether the handheld unit 86 or the base unit 84 has electrical power respectively. Thus, the memory devices 152 and 157 may advantageously include circuitry such as EEPROMS or the like. The memory devices 152 and 157 may also include one or more SIMM, DIMM, RIMM, SRAM, NVRAM, NOVRAM, DRAM, an on-board cache extension of the CPUs 150 and 156, or the like. The memory devices 152 and 157 may store executable programs as well as data files to facilitate operation of the base unit 84 or the handheld unit 86.

The communications hardware 123 of the handheld unit 86 includes one or more devices designed to communicate with devices external to the timer 80. By way of example, the communications hardware 123 of FIG. 2 includes a network interface card 130, or NIC 130, an IR transmitter/receiver 124, a RF transmitter/receiver 126, and a satellite receiver 128.

The NIC 130 may take the form of a conventional network card such as an Ethernet adapter, or may take the form of a more specialized data transmitter/receiver. The NIC 130 is directly coupled to the data port 114 to transmit and receive data via the retention portions 98 of the data port 114.

The IR transmitter/receiver 124 of the handheld unit 86 and the IR transmitter/receiver 116 of the base unit 84 transmits and/or receives infrared signals, and accordingly, requires that any associated external devices be positioned within line-of sight (i.e., an unblocked pathway for the infrared signal) of the handheld unit 86 or base unit 84, respectively. The IR transmitter/receivers 116 and 124 may have an antenna (not shown) exposed outside the housing or encased within a translucent window of the base unit 84 or handheld unit 86, respectively.

The RF transmitter/receiver 118 of the base unit 84 and the RF transmitter/receiver 126 of the handheld unit 86 transmits and/or receives radio frequency signals, and may not require line-of-sight with external devices because radio frequency signals are generally able to travel through walls and other conventional household structures. The RF transmitter/receivers 118 and 126 may have an antenna (not shown) within the housing of the base unit 84 or handheld unit 86, respectively. The satellite receiver 128 of the handheld unit receives signals from satellites, and may also include one or more antennas that need not necessarily be exposed in order to receive the associated microwave signals.

The NIC 130, IR transmitter/receivers 116 and 124, RF transmitter/receivers 118 and 126, and satellite receiver 128 are illustrated in FIG. 2 by way of example. Those of skill in the art will recognize that each of the various components 130, 124, 126, and 128 are optional, and that other communication devices may alternatively or additionally be used.

As mentioned previously, the touch screen 120 acts as both a display device and a user input device. Thus, the handheld unit 86 need not have any input device, such as buttons, knobs, or other controls, aside from the touch screen 120. In alternative embodiments, such input devices may be used in addition to or in place of the touch screen 120. If desired, the handheld unit 86 may be designed to receive voice commands and/or provide information to the user via a simulated or recorded voice.

The valve controllers 154 and 158 are designed to initiate and stop irrigation, and may thus be designed to transmit corresponding signals to the valve assemblies 42, 44, and 46. The valve controllers 154 and 158 may receive a digital signal from the buses 156 and 159, respectively, and may then provide a corresponding analog signal to any of the first, second, third, and fourth valve control terminals 104, 106, 108, and 110. If the valves 42, 44, and 46 include "latching," or bi-stable solenoids, the valve controller 148 may transmit separate "open" and "close" signals to each of the valves 42, 44, and 46. Otherwise, the valve controllers 154 and 158 may transmit a signal to open each of the valves 42, 44, and 46, and may initiate closure of each of the valves 42, 44, and 46 by ceasing to transmit the signal.

FIG. 2 illustrates the connection of the valve controller 148 to the first, second, third, and fourth valve control terminals 104, 106, 108, and 110. Additionally, FIG. 2 shows the connection of the first, second, and third valve control terminals 104, 106, and 108 to the first, second, and third valves 42, 44, and 46 via the first, second, and third control wires 54, 56, and 58, respectively.

Additionally, FIG. 2 illustrates a plurality of external devices coupled to the data line 115 of FIG. 1. The NIC 130 may be designed to connect to a plurality of devices linked in series, or "daisy-chained" together, as illustrated in FIG. 2. As shown, the external devices may include one or more sensors 170. The sensors 170 may include a wide variety of sensor types that measure environmental conditions such as rain sensors 170a, soil moisture sensors 170b, light intensity sensors 170c, temperature sensors 170d, humidity sensors 170e, and other types of environmental sensors 170f. The sensors 170 may additionally or alternatively include sensors that measure the operation of the irrigation system 10, such as flow rate sensors 170g, acoustic sensors 170h, and/or pressure sensors 170i positioned downstream of each of the valves 52, 54, and 56 to measure the actual water and/or pressure delivered to each irrigation zone, and other types of irrigation system sensors 170j. In one embodiment, the sensors 170 may include a temperature sensor 170d that causes the irrigation system 10 to cease operation if freezing temperatures are detected.

The external devices that can be coupled to the NIC 130 via the data port 114 may also include a personal computer, or PC 172. A PC 172 may be coupled to the timer 80 to facilitate programming of the timer 80, viewing of historical or operational information from the timer 80, updating the software and/or firmware of the timer 80, and other functions. If desired, the data port 114 may be bypassed in favor of a direct connection between the handheld unit 86 and the PC 172 and/or any other external device.

Direct connection between the handheld unit 86 with a PC 172 may be especially beneficial because the handheld unit 86 may easily be brought indoors to interface with a desktop computer. The handheld unit 86 may be seated in a cradle, such as those used for other electronic devices such as PDA'S, to facilitate connection of the PC 172 to the handheld unit 86. More advanced functions may be implemented via the PC 172. Additionally, the PC 172 may help to connect the handheld unit 86 to other external devices.

The external devices may also include a master timer 174. For example, the irrigation system 10 may be part of a larger irrigation system designed to irrigate a large yard, grounds on a condominium or apartment complex, or the like. Accordingly, many timers like the timer 80 may be linked together and coordinated through the use of a master timer 174. The master timer 174 may provide operational commands, display historical data, and the like, for the irrigation system 10 and for other regions of the larger irrigation system.

The external devices may also include a security system 176. The security system 176 may be designed to detect intruders with a security sensor 177, such as a motion detector or an IR laser that indicates an intruder's presence when the IR laser is blocked, and may transmit control signals to the timer 80 to activate the irrigation system 10 to discourage further trespassing by commencing irrigation. The security system 176 may alternatively be designed to halt, prevent, or postpone irrigation when a person is detected on the area 32 in order to prevent irrigation during family activities and the like on the property 24 (shown in FIG. 1) during normal irrigation times.

Additionally, the external devices may include a smart card reader 178 designed to receive data magnetically encoded on cards or other media. The smart card reader 178 enables a person to easily transfer data, such as operational commands, to the timer 80 by "swiping" an encoded card through the smart card reader 178. The smart card reader 178 may additionally or alternatively be designed to encode cards with data from the timer 80 to easily provide historical information and the like. The smart card reader 178 may be designed to operate as a security checkpoint by requiring a particular control card to be scanned prior to allowing a user to modify the operation of the timer 80 and/or view historical information. In various embodiments, the smart card reader 178 may be designed to receive a variety of different media types such as computer disks, flash memory cards, CD-ROMs, DVD-ROMs, and the like.

The base unit 84 and the handheld unit 86 may also be connected to the Internet 180 via the NIC 130 and the data port 114. The base unit 84 and the handheld unit 86 may receive information such as property lines, evapotranspiration (ET) data, clock updates, software/firmware updates, historical weather, weather predictions, and the like. Additionally, the handheld unit 86 may be connected to a variety of other external devices through the Internet 180. The Internet 180 may also be used to permit remote access to the timer 80 to remotely provide operational commands, download historical operational information, and the like.

The base unit 84 and the handheld unit 86 may also be connected to a telecommunications system 182, such as a telephone network. The telecommunications system 182 may be used to couple the timer 80 to other external devices, or to provide remote access in a manner similar to that of the Internet 180. Remote access may be provided via telephone and cellular phone.

The base unit 84 and the handheld unit 86 may also be connected to the fertilizer storage unit 132 as discussed above in reference to FIG. 1. The external devices listed above and illustrated in FIG. 2 are provided by way of example only. Any combination of external devices may be coupled to the timer 80 via the data port 114 and the NIC 130, including but not limited to external devices that will be described subsequently in connection with the IR transmitter/receivers 116 and 124, the RF transmitter/receiver 118 and 126, and the satellite receiver 128. Additionally, many of the above-listed devices may be coupled to the timer 80 via the IR transmitter/receivers 116 and 124, the RF transmitter/receiver 118 and 126, and/or the satellite receiver 128. For example, the telecommunications system 182 and/or the Internet 180 may be coupled to the timer 80 via the RF transmitter/receiver 126 via a cellular link.

As shown, the IR transmitter/receiver 116 and 124 may communicate with a PDA 186. For example, a contractor, repair serviceman, or other individual may send irrigation commands and scheduling information to the timer 80 via an infrared link of the type commonly used with PDAs. Historical information, sensor data, and the like may also be downloaded onto the PDA from the timer 80 to facilitate maintenance and system checks involving the irrigation system 10. A person may easily transmit commands to several timers in sequence, or download and compile operational data from the timers.

The RF transmitter/receivers 118 and 126 may communicate with a plurality of valve assemblies 190 uniquely designed for radio control. The valve assemblies 190 may have their own independent power source, and may be coupled to a hose bib system or the like. Thus, the valve assemblies 190 may be used to provide additional irrigation, and may particularly be useful for areas that are not easily reached by wires such as the valve wires 54, 56, and 58. The sensors 170 or other external devices may also be coupled to the timer 80 via the RF transmitter/receivers 118 and 126.

The RF transmitter/receivers 118 and 126 may also communicate with an ET data service 192 that broadcasts ET data for various locations via radio. Such an ET data service 192 may provide information such as temperature, wind speed, precipitation rates, humidity, and the like, that help the timer 80 determine how much irrigation is necessary. Alternatively, the ET data service 192 may simply transmit the necessary amount of irrigation for a given area, so that the timer 80 can use the ET data as a multiplier for irrigation duration, without further processing.

Additionally, the RF transmitter/receivers 118 and 126 may communicate with a clock update service 194 that broadcasts the current time and/or date via a radio frequency. Thus, the timer 80 may always have an accurate time and date, regardless of whether power outages or the like have occurred.

The RF transmitter/receivers 118 and 126 may further communicate with a remote control unit 196 that will be discussed below with reference to FIG. 6 in greater detail, which transmits commands and/or receives operational information via radio frequency transmission. The remote control unit 196 may be positioned at a location convenient to the user, such as within a home. The remote control unit 196 may enhance the convenient use of the timer 80 above that provided by portability of the handheld unit 86. Indeed, the handheld unit 86 need not be removable from the base unit 84, and may well be integrated with the base unit 84 if the remote control unit 196 is provided. The remote control unit 196 may also facilitate maintenance of the irrigation system 10 by enabling a person to manually activate the valves 42, 44, and 46 from anywhere on the property 24 (shown in FIG. 1).

The satellite receiver 128 may communicate with global positioning satellites, or GPS satellites 198, to receive position data. The position data provides the three dimensional location of the handheld unit 86. The position data may be used in conjunction with evapotranspiration data, weather information, or the like to tailor such information to the specific location of the irrigation system 10. The position data may even be used to plot property lines, irrigation zone boundaries, or the like. The user may simply carry the handheld unit 86 to a plurality of nodes, such as property or irrigation zone corners, and store the position data to obtain data points that can subsequently be connected to provide a map of the property 24 to be irrigated. Such a map will be illustrated subsequently, in connection with FIG. 4.

The various external devices 132, 170, 172, 174, 176, 178, 180, 182, 186, 190, 192, 194, 196, and 198 of FIG. 2 are illustrated by way of example only. With the aid of the present disclosure, those of skill in the art will recognize that a variety of other external devices may be connected to a timer such as the timer 80. Alternatively, any of such external devices may be integrated with the timer 80.

Figure 3:
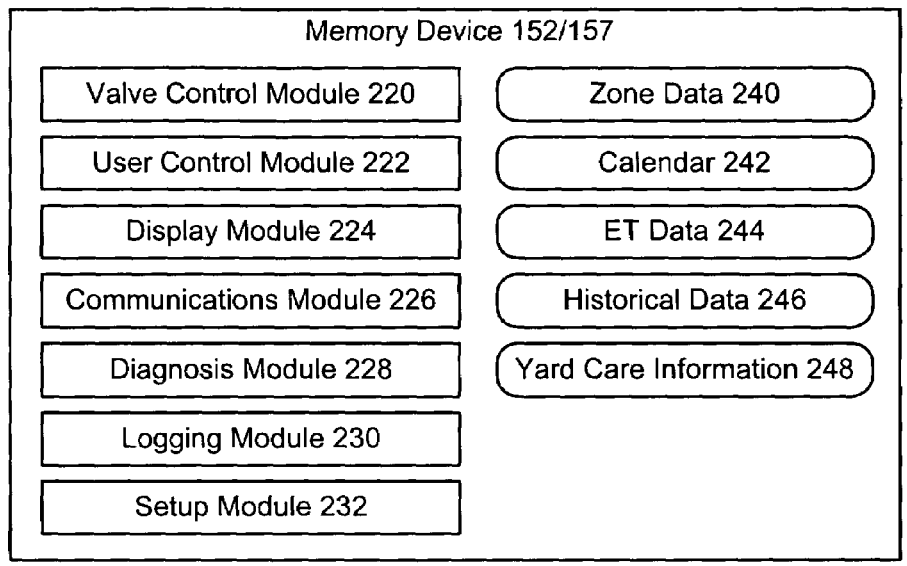
FIG. 3 is a schematic block diagram showing executable modules and data files that may be stored within the memory device of the handheld unit of FIG. 1.

Referring to FIG. 3, a schematic block diagram illustrates various executable modules and data sets that may be stored by the memory devices 152 and 157. As shown, the memory devices 152 and 157 may contain program modules including a valve control module 220, a user control module 222, a display module 224, a communications module 226, a diagnosis module 228, a logging module 230, and a setup module 232. Additionally, the memory devices 152 and 157 may contain data including irrigation zone data 240, a calendar and irrigation schedule module 242, ET data 244, historical data 246, and yard care information 248.

The irrigation zone data 240 includes data specific to each zone of the irrigation system 10, i.e., the portion of the area 32 irrigated via water flow through each of the valves 42, 44, and 46. The irrigation zone data 240 may include a wide variety of information such as the irrigation zone name, type of plant life to be irrigated on the irrigation zone, the type of soil in the irrigation zone, the amount of sun received by the irrigation zone, the number and type of water distribution units 26, 28, 30 present within the irrigation zone, and the like. User generated data, such as repair notes, irrigation zone appearance, root depth, and the like may also be included in the irrigation zone data 240.

The calendar and irrigation schedule 242 includes dates and weekdays that correspond to them. Additionally, the calendar and irrigation schedule 242 includes watering times and durations for each of the zones of the irrigation system 10. The calendar and irrigation schedule 242 may extend for a full year, and may thus include a program that provides different watering conditions for each month of the year. The calendar and irrigation schedule 242 may have a multiplier applied to the irrigation for each month, i.e., 90% for July, 80% for August, etc. Thus, the calendar and irrigation schedule 242 may automatically manage changes in irrigation needs over the course of a year.

The calendar and irrigation schedule 242 may alternatively include exclusion times during which normally programmed irrigation is cancelled or postponed. For example, the calendar and irrigation schedule 242 may be designed to prevent any irrigation on the Fourth of July, so as to avoid interfering with outdoor holiday festivities. The calendar and irrigation schedule 242 may also include programming for unique irrigation patterns, such as "pulsing" or "multiplexing" operation of the water distribution units 26, 28, 30 to minimize water runoff.

The ET data 244 may include the information described previously, such as temperature, precipitation, humidity, sun intensity, and the like, for the area 32. From such data, the timer 80 may compute how much irrigation should be applied to each zone of the area 32. Alternatively, the ET data 244 may simply include a multiplier or a general required watering amount.

The historical data 246 may include a variety of information. For example, the historical data 246 may include past irrigation schedules. Additionally, the historical data may include information gathered from the sensors 170, such as past weather conditions, actual irrigation water flow amounts, and the like. Furthermore, the historical data 246 may include data provided by the user, such as information regarding repairs to various components of the irrigation system 10, root depth measurements, and the like. Any information that may be helpful to the user and/or the operation of the timer 80 may be included in the historical data 246.

The historical data 246 may be used as a basis for programming future irrigation, either by the user or by the timer 80 independently of the user's involvement. For example, if the historical data 246 indicate that a given month tends to be very hot and dry, future irrigation during that month may be proportionately increased. The touch screen 120 may provide the historical data 246 in a variety of formats including tables, charts, graphs, and the like, and may enable easy comparison between the current year and previous years.

The yard care information 248 may be tailored to specific geographic regions, climates, elevations, or climates of an area. The yard care information 248 stored in the memory devices 152 and 157 also be augmented by information obtained from the internet or other external devices. The yard care information 248 may include information generally helpful for yard care, including fertilization, pest control, weed control, and the like. For example, the yard care information 248 may include appropriate seasons and/or dates on which to apply various types of fertilizer, and what pesticides or weed killers to apply based on given symptoms and the calendar. Alternatively, the yard care information 248 may include suggestions on trimming bushes and trees, mowing the lawn, and weeding a garden. The yard care information 248 may be tied into the calendar and irrigation schedule 242 to provide reminders of when to perform certain tasks. Thus, the timer 80 may operate as a generalized yard care station.

The valve control module 220 is designed to control operation of the valves 42, 44, 46, and may thus communicate with the valve controller 148 of FIG. 2. The valve control module 220 may operate by cyclically comparing the current time to the calendar and irrigation schedule 242 to determine whether a valve control event, i.e., opening or closing a valve, is to occur at the current time. Corresponding commands may then be sent to the valve controller 148. The valve control module 220 may also operate RF valves such as the RF controlled valves 190 of FIG. 2, and may thus transmit corresponding commands to the communication hardware 123 or data port 114, or more specifically, to the RF transmitter/receivers 118 or 126.

The user control module 222 receives input and commands from a user. Accordingly, the user control module 222 may receive and process input from the touch screen 120 of the handheld unit 86. The user control module 222 may also interface with the zone data 240, calendar 242, yard care information 248, and/or other data sets to store user preferences for zone information, watering times, yard care reminders, and the like.

The display module 224 controls the display function of the touch screen 120. Accordingly, the display module 224 may be linked to the touch screen 120 to deliver and format information to be shown on the touch screen 120. The display module 224 may receive such information from various sources, including the zone data 240, calendar and irrigation schedule 242, ET data 244, historical data 246, and yard care information 248. Such information may also be received directly by the display module 224 from external devices connected to the timer 80, such as the various external devices coupled to the communications hardware 123 of FIG. 2.

The communications module 226 controls communication between the external devices illustrated in FIG. 2 and the timer 80. The communications module 226 may thus communicate with the communications hardware 123 or the data port 114 to initiate acquisition of data, transmission of data to the external devices, and the like. The communications module 226 may also convey data from the external devices to the proper location. For example, data from sensors 170 may be conveyed to the memory devices 152 or 157 for storage as ET data 244 and/or historical data 246.

The diagnosis module 228 monitors the operation of the irrigation system 10. The diagnosis module 228 may receive data from external devices such as sensors 170. For example, the diagnosis module 228 may monitor pressure and/or water flow rates downstream of the valves 42, 44, 46 to determine whether proper irrigation of the various irrigation zones of the irrigation system 10 is occurring. Additionally, the diagnosis module 228 may be coupled to the valve controller 148 to diagnose operation of the valves 42, 44, 46 independent of the sensors 170. For example, the valve controller 148 may be designed to measure the impedance of a signal provided to the valves 42, 44, or 46 to determine whether the valves 42, 44, 46 are functioning properly. The diagnosis module 228 may trigger cessation of operation and/or issuance of an alert when the diagnosis module 228 detects that the irrigation system 10 is not operating properly.

The logging module 230 may continuously log data in the historical data 246. The data may be obtained from external devices such as the sensors 170, from the calendar and irrigation schedule 242 (e.g., as irrigation is performed, an irrigation event is logged in the historical data 246), and/or from other sources. The logging module 230 may also receive data from the user to record information such as repairs, root depth measurements, and the like.

The setup module 232 is designed to facilitate setup and programming of the timer 80. The setup module 232 may have a step-by-step process that asks the user questions such as when irrigation should be performed, how long irrigation should be carried out with each application, and the like. The setup module 232 may alternatively collect information regarding the property 24, such as location, average rainfall, type of plant life, and the like to determine when and/or how much water should be applied. Some of the information may be collected via the sensors 170, the ET data service 192, and/or other external devices.

The setup module 232 may record data in the calendar and irrigation schedule 242 to arrange for future irrigation. The setup module 232 may also record the irrigation zone data 240. Thus, as part of the setup process, the user may enter the name of the irrigation zone, the geometry of the irrigation zone, the type of plants in the irrigation zone, the number and type of water distribution units 26, 28, 30, the location of water distribution units 26, 28, 30 and distribution conduits 36, 38, 40, and/or other information particular to each irrigation zone of the area 32. A variety of different icons, representing different landscaping features, parts of the irrigation system 10, or the like, may be dragged into place with the stylus 102.

The zone data 240 may then be used, with or without assistance from the user, in establishing watering times and durations for the calendar 242. According to one example, the setup module 232 is able to recognize different microclimates and automatically initiate the proper irrigation pattern for each.

The various components 220, 222, 224, 226, 228, 230, 232, 240, 242, 244, 246, 248 of the memory devices 152 and 157 are disclosed by way of example. Other data sets and/or executable modules may be used in addition to or in the alternative to those illustrated in FIG. 3.

Figure 4:
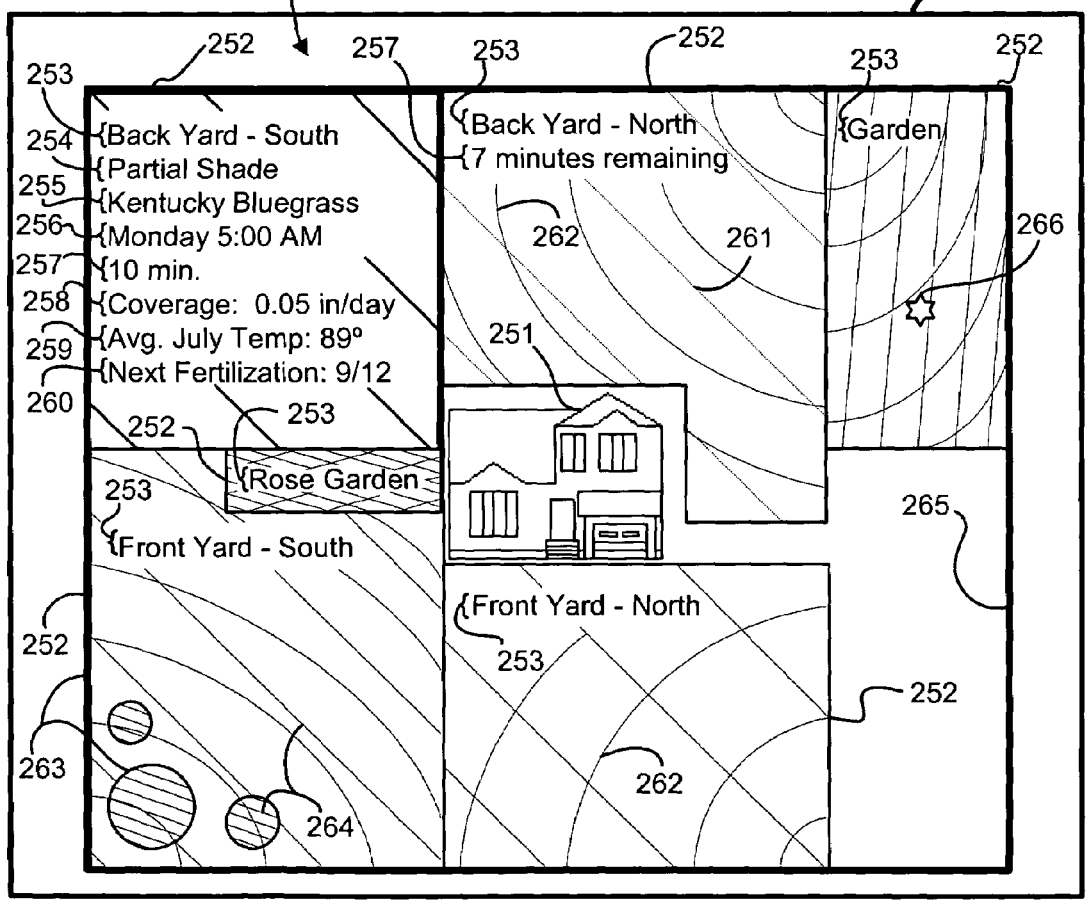
FIG. 4 is a front elevation view of the touch screen of the handheld unit of FIG. 1, illustrating one potential interface for viewing zone information and providing irrigation commands.

Referring to FIG. 4, a front elevation view illustrates the touch screen 120, with one potential user interface. As shown, the touch screen 120 displays a map 250. The map 250 may display a structure icon 251 representing a residence or other structure. A plurality of geometric shapes are distributed around the home icon 251, with each shape or group of shapes corresponding to an irrigation zone 252 of the irrigation system 10. Each of the irrigation zones 252 on the touch screen 120 may be selectable, for example, by tapping on the irrigation zone 252 with the stylus 102, to display additional information about the irrigation zone 252 and enable a user to change the associated irrigation zone data 240 and/or other parameters stored in the memory devices 152 and/or 157.

In FIG. 4, the irrigation zone 252 on the upper left, named "Back Yard—South" 253 has been selected. A variety of information is displayed in connection with the selected irrigation zone 252. For example, the information displayed may include zone data 240 such as the name 253 of the irrigation zone 252, the amount of sunlight received in the irrigation zone 254, and the type of plant life in the irrigation zone 255. Additionally, information from the calendar and irrigation schedule 242 may be displayed, such as the date and time 256 at which the irrigation zone 252 is normally irrigated and the programmed duration 257 for irrigation.

Information from the ET data 244 may also be displayed, such as the required amount of irrigation or irrigation fluid coverage 258 for the irrigation zone 252, during the current time of year. Historical data 246 such as the average temperature 259 from previous years may also be displayed. Yard care data 248 such as the date 260 at which fertilization should next be performed, may also be displayed.

The user interface of FIG. 4 may also permit modification of the parameters of the selected irrigation zone. For example, a user may easily adjust the established watering duration 257 of an irrigation zone 252 by tapping on the irrigation zone, tapping on the watering duration information 257 from the calendar and irrigation schedule 242, and then providing a new value. New values may be provided via popup menus or the like. Alternatively, a user may tap a series of new numbers from a popup numeric keypad. A user may also drag a vertical slider or hands on a clock to desired positions to establish the desired watering duration. On-screen help, in the form of a text database, an interactive "help character," or the like may be used to aid the user in performing various functions.

Additionally, if irrigation is currently being carried out by the irrigation system 10 within one of the irrigation zones 252, the irrigation may be indicated by a unique identifier 261. For example, the zone named "Back Yard—North" 253 is currently being irrigated so a dotted cross hatching 261 is shown. Accordingly, current irrigation data 257 is displayed to indicate the status of current irrigation. As shown, the current irrigation data 257 may include the amount of time remaining in the programmed irrigation.

Various indicators 262, such as color coding, grey scale coding, cross hatching, and the like may be used to differentiate the irrigation zones 252 from each other. Alternatively, "microclimates" 263 (i.e., garden, flowerbeds, yard, etc.) may be displayed with other indicators 264, such as different colors, gray scales, or hatching patterns. Additionally, an irrigation zone may include a plurality of microclimates 263 that are each indicated 264 on the map 250. The currently selected irrigation zone 252 may be also be displayed with a different color, gray scale, or hatching pattern, while the irrigation zone 252 in which irrigation is currently occurring may be displayed in yet another color, gray scale, or hatching pattern.

The irrigation zones 252 may easily be set up in a variety of ways. According to one method, the setup module 232 may provide a setup screen in which a variety of icons may be "dragged" into various positions on the touch screen 120. For example, the home icon 251 may first be dragged into position. The irrigation zones 252 may then be defined by dragging node icons (not shown) into position to form the corners of the irrigation zones 252 and connecting them by drawing lines between them to form the shapes of the irrigation zones 252. Various shape icons may also be dragged into position to form zones of different shapes, such as the irrigation zone 252 named "Rose Garden" 253.

Alternatively, as described above, connection to the Internet 180 and/or the GPS satellites 198 may be used to define the boundaries 265 of the property 24 and to delineate the irrigation zones 252. The current position 266 of the handheld unit 86 is shown on the map by an icon, which in this embodiment is a star. The current position 266 may be stored for use in a memory device 152 or 157 of the timer 80 in FIG. 2 as a position node by tapping on the icon. A user may then connect the node with other nodes to delineate a portion of the map.

The user interface of FIG. 4 may provide multi-lingual capability, including the ability to select from a list of languages. Displayed text, text entry devices, and the like may then be adapted for the selected language. As mentioned previously, the timer 80 may provide voice activation or voice response capability. Such vocal functions may also be provided in multiple languages.

Figure 5:
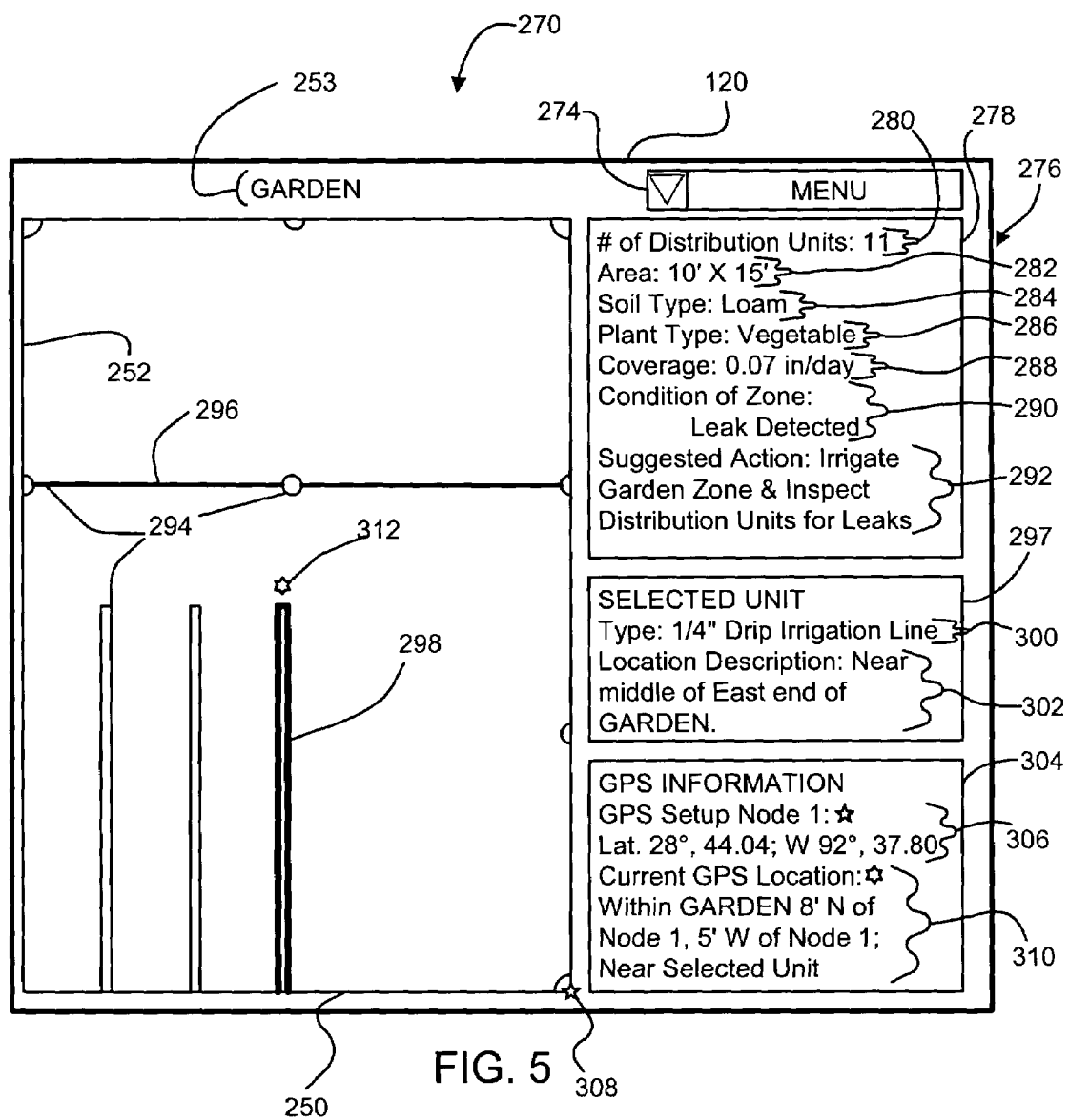
FIG. 5 is a front elevation view of the touch screen of the handheld unit of FIG. 1, illustrating an irrigation zone detailed view for viewing specific zone information and providing irrigation commands.

Referring to FIG. 5, a front elevation view illustrates a detailed view 270 of the "Garden" irrigation zone 252 that may be accessed by tapping on an irrigation zone 252 displayed on the map 250 in FIG. 4. When an irrigation zone 252 is selected, the map 250 zooms in on the selected irrigation zone 252 and the unique name 253 of the irrigation zone 252 is presented above the displayed irrigation zone 252. A dropdown menu 274 is provided to facilitate the viewing, accessing, and modifying of irrigation zone information. Information related to the irrigation zone 252 is displayed in information boxes 276.

General irrigation zone information is displayed in the first information box 278, such as the number of irrigation units 280 that distribute irrigation fluid over the irrigation zone 252, the area 282 of the irrigation zone, the type of soil 284 of the irrigation zone 252, the type of plant 286 that generally populates the irrigation zone 252, the required amount of water for coverage 288 of the irrigation zone 252, the condition 290 of the irrigation zone 252, and suggested action 292 to improve the condition 290 of the irrigation zone 252.

The detailed view 270 displays the location of distribution units 294 and a distribution conduit 296 associated with the irrigation zone 252 on the map 250. Objects displayed by the detailed view 270 may be highlighted to display specific information in one of the information boxes 276. As shown, the second box 297 displays information related to a selected object on the map 250. Specifically, a drip irrigation unit 298 is highlighted. The type 300 and location 302 of the drip irrigation unit 298 is displayed. This information can be used to facilitate the replacement or repair of a damaged portion of the irrigation system by providing a user with information to select the proper replacement parts.

The third information box 304 displays GPS information. Specifically, the position data 306 of a node 308 is provided in the third information box 304. Additionally, the location of the node 308 is also displayed on the map 250. The position data 310 of the handheld unit 86 is also provided in the third information box 304 with reference to the node 308 and the location 312 displayed on the map 250.

In addition to the information shown in FIGS. 4 and 5, the touch screen 120 may display a variety of other information including weather predictions, sensor measurements, repair history, irrigation history, and the like. A wide variety of menu formats and the like may be used in addition to or in the alternative to the interface illustrated in FIG. 4 to provide additional functionality. Setup menus, problem diagnosis menus, communication menus, and the like may be used.

Figure 6:
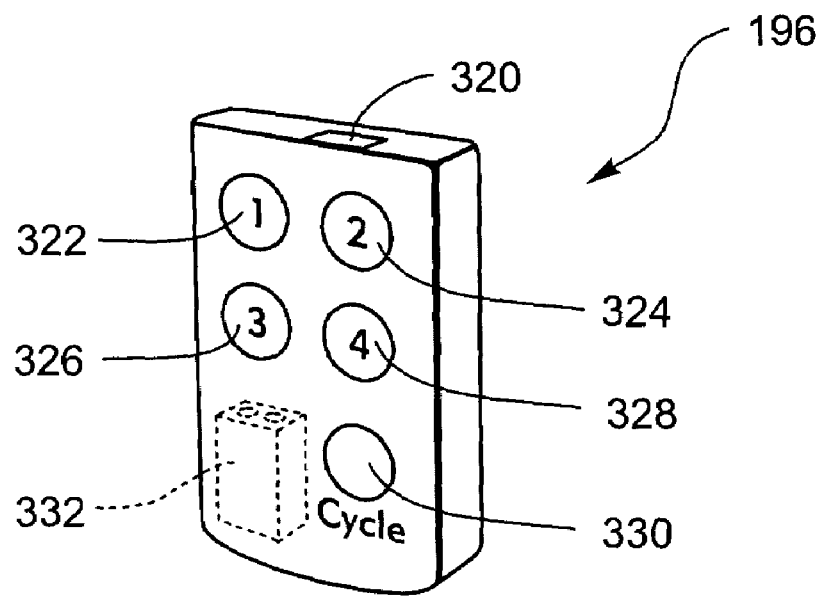
FIG. 6 is a perspective view of remote control that may be used with the timer of FIG. 1.

Referring to FIG. 6, a perspective view illustrates the remote control 196 discussed above with reference to FIG. 2. The small size of the remote control 196 permits it to be easily carried around by a user repairing, visually inspecting, or testing an irrigation system. The remote control 196 may permit a user to manually open, close, and cycle through the valves 42, 44, and 46 (shown in FIG. 1) from a remote location.

The remote control 196 includes a RF transmitter 320 and a first, second, third, and fourth buttons 322, 324, 326, and 328 for operating a respective valve control terminal 104, 106, 108, and 110 of the timer 80 (shown in FIG. 1). A fifth button 330 provides a user with a cycle function. Each time a user presses the fifth button, a valve attached to one of the valve control terminals 104, 106, 108, and 110 is closed and another opened. The remote control 196 may also include a battery 332 for powering the RF transmitter 320.

Alternatively, the functions associated with the buttons 322, 324, 326, 328, and 330 may be redefined by the timer 80 to provide a different set of operations as desired by the user. Additionally, a wide variety and number of controls and functions may be used with the remote control unit 196.

Figure 7:
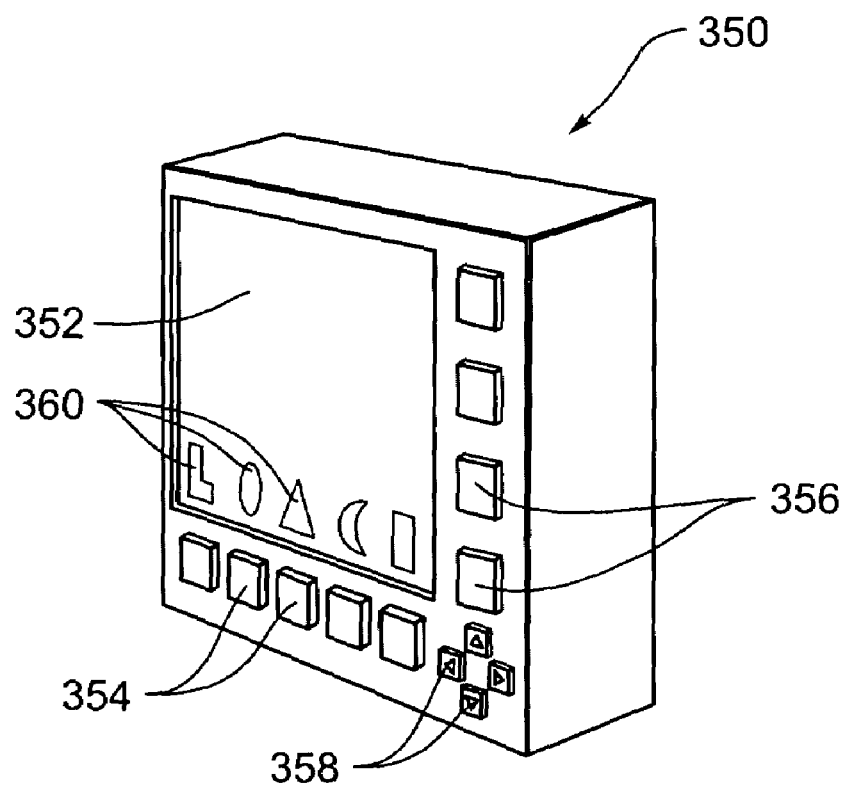
FIG. 7 is a perspective view of a handheld unit of a timer according to one alternative embodiment of the invention, in which a conventional screen is combined with buttons to replace the touch screen of the handheld unit of FIG. 1.

Referring to FIG. 7, a perspective view illustrates a handheld unit 350 according to one alternative embodiment of the invention. The handheld unit 350 may be used in conjunction with the base unit 84 of FIG. 1 to provide a timer 80. The handheld unit 350 has a screen 352, which need not provide user control (i.e., touch screen) functionality. Rather, in order to reduce costs, the screen 352 is a simple display. Additionally, the handheld unit 350 has horizontal buttons 354 and vertical buttons 356 arranged adjacent to the screen 352. The handheld unit 350 also has four directional buttons 358. The buttons 354, 356, 358 are used in place of touch screen functionality to enable the user to interact with the handheld unit 350.

More precisely, the screen 352 may display "soft buttons," or icons that correspond to the horizontal and/or vertical buttons 354, 356 to provide various menus. For example, in FIG. 7, the screen 352 displays an array of horizontal button icons 360, which are aligned with the horizontal buttons 354 of the handheld unit 350. Each icon 360 includes text and/or a picture to indicate the function performed by the adjacent button of the horizontal buttons 354. Vertical button icons (not shown) may additionally or alternatively be displayed by the screen 352 to indicate functions performed by the vertical buttons 356. Alternatively, the vertical buttons 356 may have common timer functions, such as start/stop watering, switch zones currently being watered, etc.

As the user navigates through various menus, the horizontal button icons 360 and/or vertical button icons may be changed to reflect the functions of the different menus. Thus, each of the horizontal and/or vertical buttons 354, 356 may perform multiple functions. The functions of the buttons 354, 356 may be indicated by other devices aside from icons; for example, the screen 352 may display a line of text or an animated object associated with each of the horizontal and/or vertical buttons 354, 356. The directional buttons 358 may be used to position items on the screen 352, such as positioning the home icon 251 and establishing the boundaries of the irrigation zones 252, as illustrated in FIG. 4.

Those of skill in the art will recognize that the various features and components of the timer 80 and the handheld unit 350 of FIG. 7 may be combined to form a wide variety of additional timers according to the invention. Such timers may be coupled to many different electrical devices, of which only a few examples are illustrated in FIG. 2. Additionally, timers according to the invention may perform a variety of functions not specifically illustrated or described herein.

Figure 8:
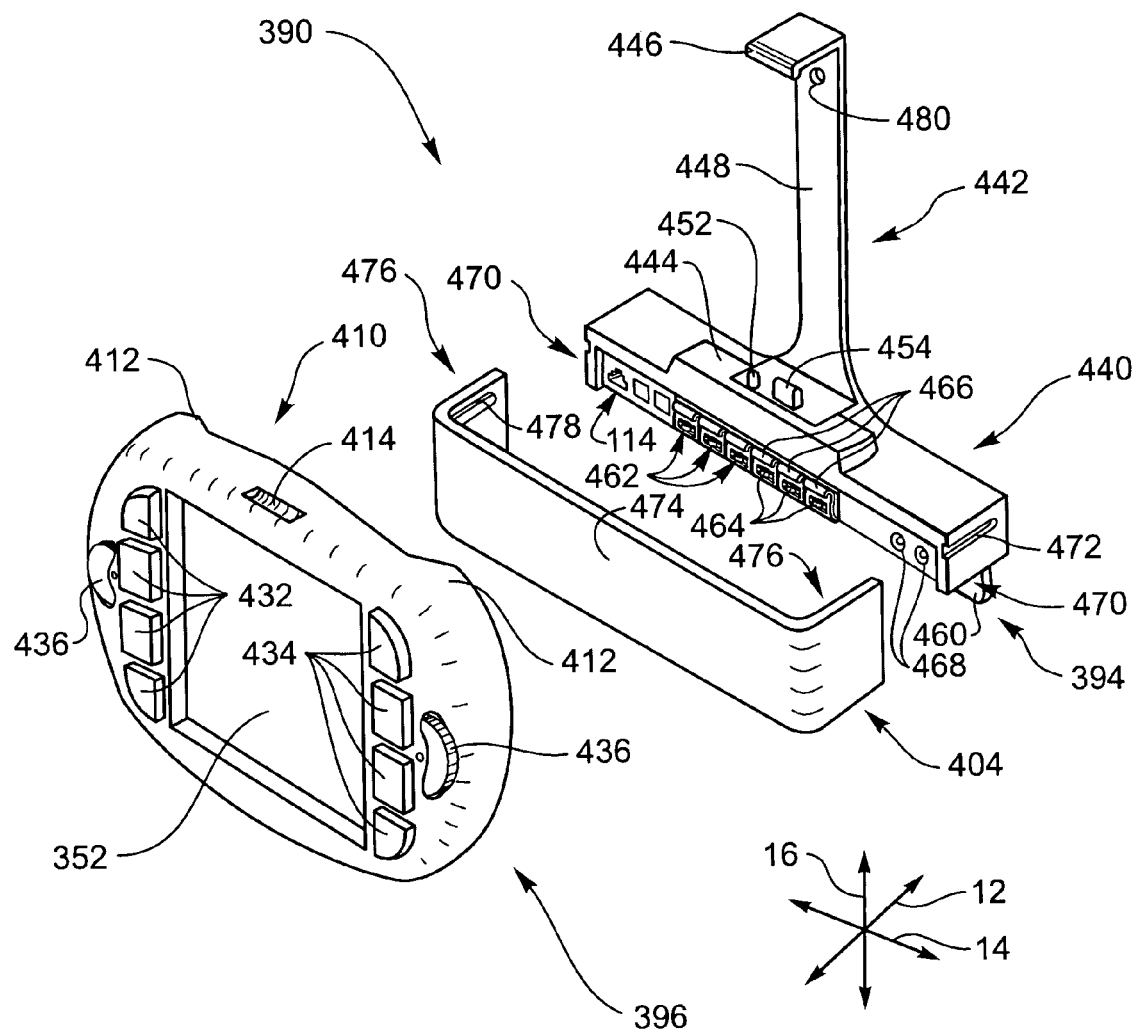
FIG. 8 is an exploded, perspective view of a timer according to another alternative embodiment of the invention.

Referring to FIG. 8, a perspective view illustrates a timer 390 according to another alternative embodiment of the invention. As shown, the timer 390 includes a base unit 394 designed to be mounted to a wall or the like, and a handheld unit 396 that is removably attachable to the base unit 394. The timer 390 also includes a shroud 404 meant to removably cover a portion of the base unit 394, as will be described subsequently.

As shown, the handheld unit 396 includes a central portion 410 and a pair of grips 412 positioned to either lateral side of the central portion 410. The grips 412 are ergonomically shaped to permit a user to easily and comfortably grasp the handheld unit 396 with either one or two hands. The central portion 410 has a recess 414 that facilitates retention of the handheld unit 396 by the base unit 394.

The handheld unit 396 includes a screen 352 like that of the previous embodiment. The screen 352 need not be touch sensitive, and may be color or monochrome. A first set of vertical buttons 432 is arranged along one side of the screen 352 and a second set of vertical buttons 434 is arranged along the opposite side of the screen 352.

As in the previous embodiment, the first and second sets of buttons 432, 434 perform functions indicated by text and/or icons displayed on the screen 352 next to their corresponding buttons. The text and/or icons may change as the user navigates through various menus to enable each button of the first and second sets of buttons 432, 434 to perform multiple functions.

The handheld unit 396 also includes a pair of dials 436, one on each side of the handheld unit 396. The dials 436 may be rotated, for example, by the user's thumbs, to rapidly select numbers or other items. For example, irrigation times, irrigation durations, and other numerical selections may be made through the use of the dials 436. The dials 436 may also be used to navigate between various menus or informational displays, move items on the screen 436, or perform other functions. The dials 436 may be interchangeably used to perform the same set of functions. Alternatively, each of the dials 436 may perform different functions.

As illustrated in FIG. 8, the base unit 394 may have a wire connection portion 440 designed to permit connection of various wires to the base unit 394, and a retention portion 442 that receives the handheld unit 396. The retention portion 442 is designed to secure the handheld unit 396 to the base unit 394. Often timers 390 are disposed in garages and other high traffic areas where they may be bumped, which may dislodge an unsecured handheld unit 396. Timers 390 may also be disposed outside where high winds could easily dislodge an unsecured handheld unit 396.

The retention portion 442 includes a receiving trough 444 shaped to receive the lower portion of the handheld unit 396, and a retention arm 446 that engages the recess 414 of the central portion 410 of the handheld unit 396. The retention arm 446 is coupled to the wire connection portion 440 and the receiving trough 444 via a backing arm 448.

The retention arm 446 is able to flex to receive the recess 414. Accordingly, the lower portion of the handheld unit 396 may first be inserted into the receiving trough 444, and the upper portion may then be pressed longitudinally toward the backing arm 448 so that the retention arm 446 flexes and snaps into engagement with the recess 414. Removal of the handheld unit 396 may be accomplished by reversing the above steps, or by pressing the handheld unit 396 upward to induce flexure of the retention arm 446, and then pivoting the lower portion of the handheld unit 396 out of engagement with the receiving trough 444.

The retention portion 442 is designed to facilitate electrical coupling between the handheld unit 396 and the base unit 394. Accordingly, the retention portion 442 has a power coupling 452 and a data coupling 454 that are designed to fit into corresponding jacks (not shown) in the lower rear portion of the handheld unit 396. The power coupling may convey electrical power, such as 24 Volt DC current, to the handheld unit 396. The handheld unit 396 may have a rechargeable battery (not shown) like the battery 122 of the handheld unit 86 of the first embodiment. The data coupling 454 may be a serial data connector such as a USB connector or the like.

The wire connection portion 440 has a backing plate 460 that abuts the surface to which the base unit 394 is mounted. The wire connection portion 440 also includes a data port 114 like the data port 114 of the base unit 84 of the first embodiment. Additionally, the wire connection portion 440 has a plurality of terminals 462, which may be used to communicate with various external devices, such as the valves 42, 44, 46. Each of the terminals 462 have a quick-connect wire system, with a slot 464 into which a stripped end of a wire (such as the valve wires 54, 56, or 58) is insertable. Each terminal 462 also has a retention lever 466 that may be coupled to a resilient contact.

A retention lever 466 may be pressed upward, and a stripped wire end may then be inserted into the adjacent slot 464. The retention lever 466 may then be released to grip and make electrical contact with the stripped wire end. Thus, wires such as the valve wires 54, 56, 58 may easily be coupled to the terminals 462.

The terminals 462 may include a pair of power input terminals 468 that receive electrical power form a source such as the AC adapter 88 of the timer 80 of the first embodiment. The AC adapter 88 may include a transformer that transforms the electric power to provide the voltage and current required by the timer 390. Alternatively, the base unit 394 may have a built-in transformer, and may be coupled to a simple electric plug. The power input terminals 468 may alternatively be coupled to a different power source such as the solar cell 90 illustrated in FIG. 1. Alternatively, additional power input terminals (not shown) may be provided to receive solar energy to supplement AC electricity from a standard outlet.

Any of the terminals 462 and/or the data port 114 may be removable, and may be provided as modules separate from sale of the timer 390. For example, the timer 390 may be sold with enough terminals 462 to receive power and to permit connection of the timer 390 to four valves. Additional terminals 462 may be purchased in blocks, each of which expands the capacity of the timer 390 by four valves. Each block may be snapped into place to connect with electrical contacts (not shown) within the wire connection portion 440. The timer 390 may thus be expanded to enable twelve valves to be controlled. The circuitry to provide control of the additional valves may already be included in the handheld unit 396, as initially sold. The data port 114 may also be sold as a modular attachment because coupling of the timer 390 to external devices besides valves is purely optional.

The wire connection portion 440 also has a pair of side walls 470 positioned on either side of the data port 114 and the terminals 462. Each of the side walls 470 has a shroud retention groove 472 with a generally elongated shape extending in the longitudinal direction 12. The shroud 404 has a central plate 474 designed to cover the data port 114 and the terminals 462 when the shroud 404 is inserted into engagement with the wire connection portion 440. The shroud 404 may also have a bottom plate (not shown) with slots or holes through which wires, such as the data line 115, wires 94, and/or the valve wires 54, 56, 58 may pass.

Alternatively, the shroud 404 may be open on the bottom side to permit unobstructed passage of wires to the terminals 462 and the data port 114 from underneath the base unit 394.

The shroud 404 also has a pair of side plates 476 designed to extend parallel to and outside of the side walls 470 of the wire connection portion 440. Each of the side walls 470 has an elongated projection 478 that slides into the shroud retention groove 472 of the corresponding side wall 470. Thus, the shroud 404 is retained by the side walls 470 until withdrawn from the wire connection portion 440 by a user to expose the terminals 462 and the data port 114.

As illustrated in FIG. 8, the backing arm 448 has a mounting hole 480 through which a screw or other fastener (not shown) may be inserted to attach the base unit 394 to a wall or to another structure. Two additional mounting holes (not shown) may be formed in the backing plate 460 of the wire connection portion 440 to permit more stable attachment of the base unit 394 to the surface. The additional mounting holes may include slots that extend in the lateral and transverse directions 14, 16, respectively, to facilitate mounting of the base unit 394.

The structural portions of the base unit 394, the handheld unit 396, and the shroud 404 may be formed of plastic via injection molding or the like. The various electrical components of the timer 390 may be manufactured via known methods, and may include components similar to those shown and described in connection with FIGS. 2 and 3.

Figure 9:
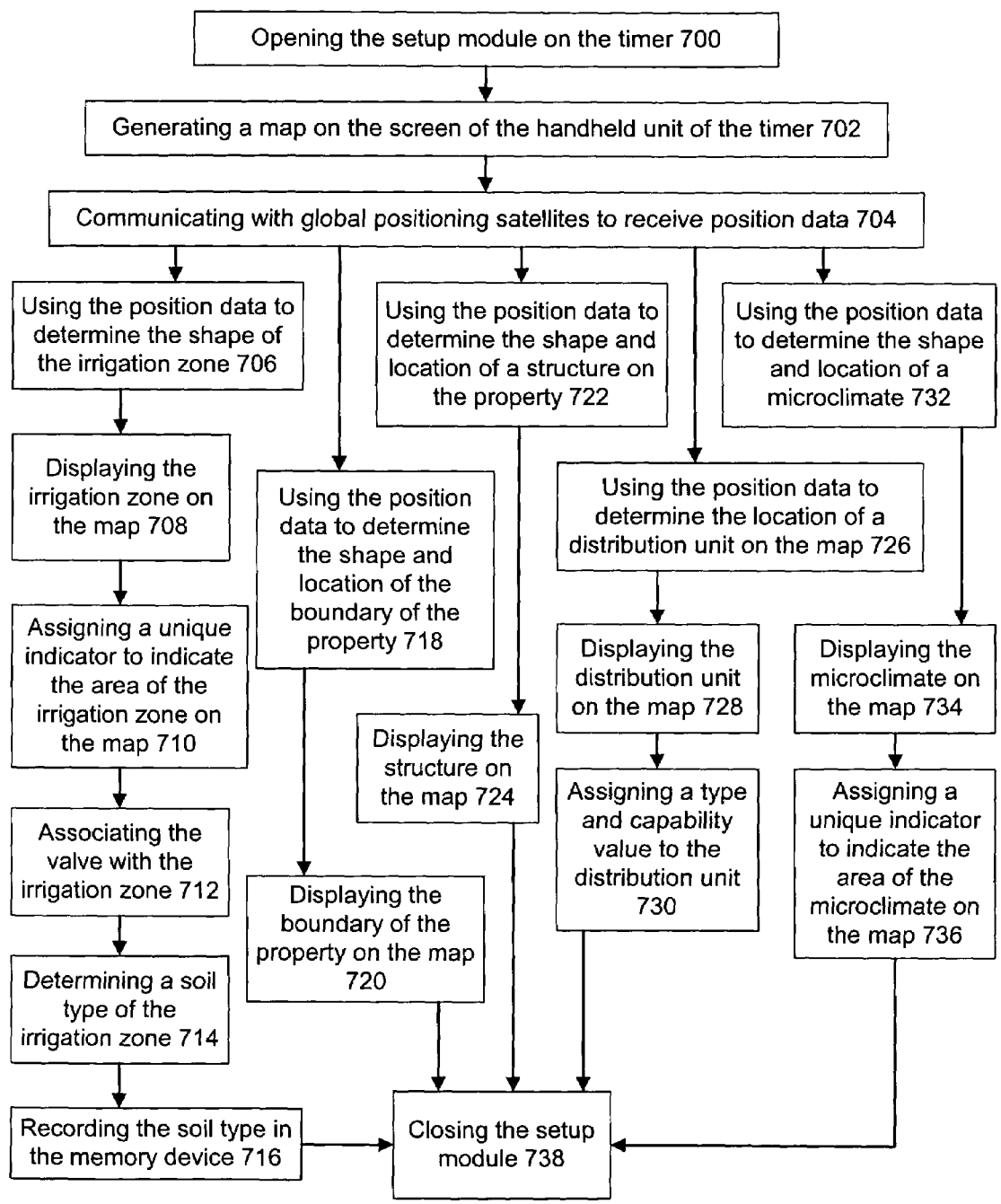
FIG. 9 is a flow chart illustrating a method of setting up a timer with a satellite receiver for receiving position data.

Referring to FIG. 9, a flow chart illustrates a method of setting up the timer 80 of FIG. 1. The method may include the steps of opening the setup module on the timer 700 and generating a map on the screen of the handheld unit of the timer 702. The map may initially be a blank area on the screen of the timer. The method may also include the steps of communicating with global positioning satellites to receive position data 704, using the position data to determine the shape of the irrigation zone 706, and displaying the irrigation zone on the map 708. As noted above, the position data is used to set position nodes in the memory of the timer. The position nodes are then connected to delineate the border of the irrigation zone, a property boundary or some other object that will be displayed on the map.

Once the irrigation zone is displayed on the map, the method may include the steps of assigning a unique indicator to indicate the area of the irrigation zone on the map 710 and associating the valve with the irrigation zone 712. The indicator may be a border, a name or label, a color, or cross hatching the area of the irrigation zone. The method may include the steps of determining a soil type of the irrigation zone 714, inputting the soil type in the memory device 716 of the timer. Soil type may be used in determining the irrigation schedule because different soils have different irrigation fluid absorption characteristics. For example, soil with a lot of clay should be irrigated in a series of multiple short time periods, while a loam type soil may be irrigated in a single period of time.

Additional objects may also be added to the map through the steps of using the position data to determine the shape and location of the boundary of the property 718, displaying the boundary of the property on the map 720, using the position data to determine the shape and location of a structure on the property 722, and displaying the structure on the map 724. For example, the handheld unit 86 of the timer 80 may be physically moved along the property boundary or along a side of a structure, such as a house, recording multiple position nodes in the memory device of the handheld unit. The nodes may then be used to construct the property boundary for display on the map.

Additionally, the method may incorporate the steps of using the position data to determine the location of a distribution unit on the map 726, displaying the distribution unit on the map 728, and assigning a type and capability value to the distribution unit 730. In this step, the handheld unit is placed over the distribution unit and a position node is recorded. The position node may then associated with the distribution unit. Alternatively, where the distribution unit is a length of drip irrigation tubing, multiple nodes may be used to determine its location and positioning on the map.

Even more detail may be displayed on the map and stored in the timer by the steps of using the position data to determine the shape and location of a microclimate 732, displaying the microclimate on the map 734, and assigning a unique indicator to indicate the area of the microclimate on the map 736. Once the level of detail desired by a user has been obtained, the last step of the method is closing the setup module 738.

Figure 10:
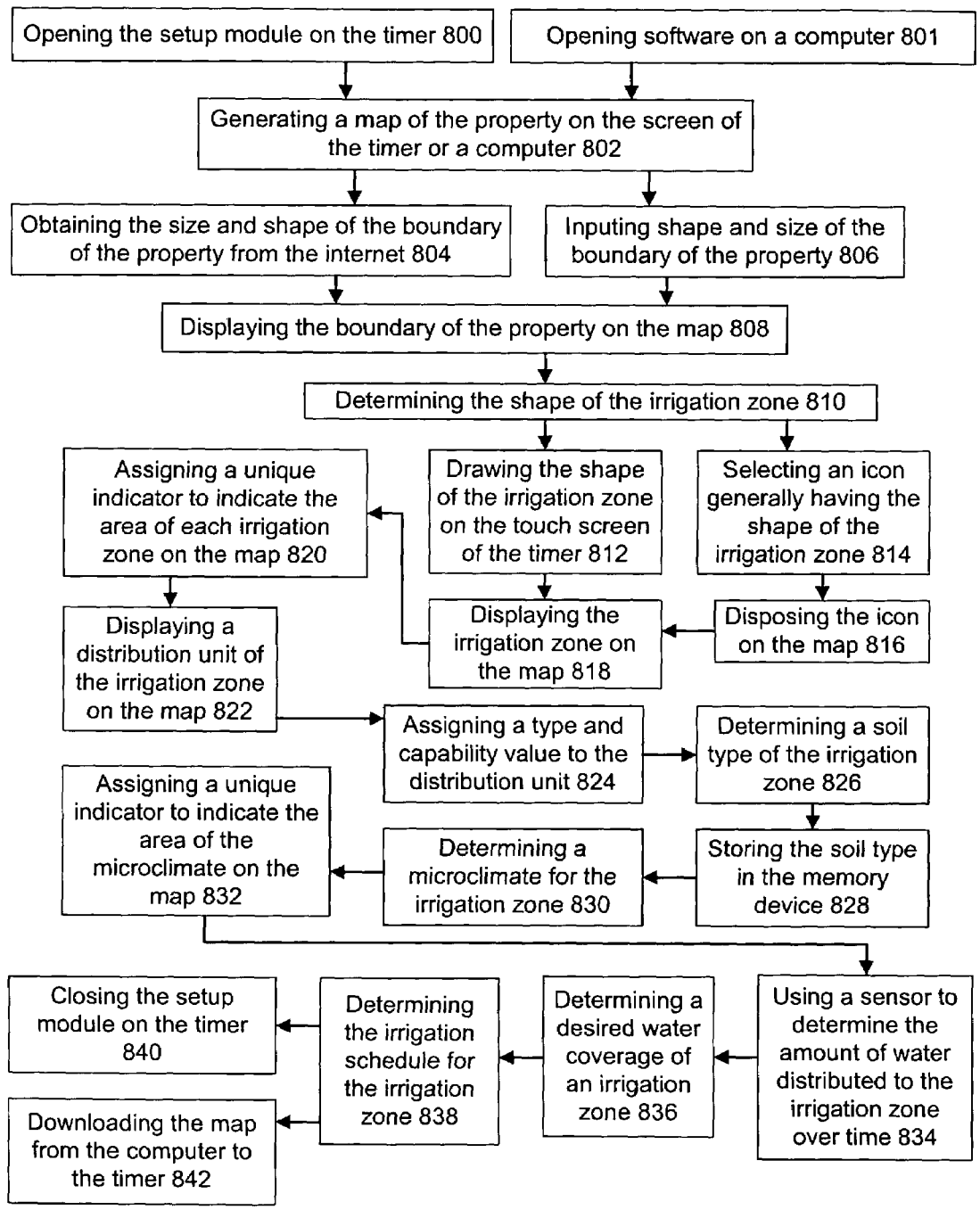
FIG. 10 is a flow chart illustrating alternative methods of setting up a timer.

Referring to FIG. 10, a flow chart illustrates alternative methods of setting up the timer 80 of FIG. 1. The method includes the steps of opening the setup module on the timer 800 or opening software on a computer 801, and generating a map of the property on the screen of the timer or a computer 802. The map may be created using software on the customer's computer, an internet site, or on a kiosk in a store.

The method may also include the step of obtaining the size and shape of the boundary of the property from the internet 804 or alternatively, the step of inputting the shape and size of the boundary of the property 806. In the step of inputting the shape and size of the boundary of the property 806, a user may select an icon having a basic geometric shape. The user then disposes the icon on the map and then defines the lengths of the sides of the icon to provide the size of the property boundary.

The method also includes the steps of displaying the boundary of the property on the map 808 and determining the shape of the irrigation zone 810. The method may either include the step of drawing the shape of the irrigation zone on the touch screen of the timer 812 or the steps of selecting an icon generally having the shape of the irrigation zone 814 and disposing the icon on the map 816, which is similar to inputting the shape and size of the boundary of the property 806. Additionally, the method may include the steps of displaying the irrigation zone on the map 818 and assigning a unique indicator to indicate the area of each irrigation zone on the map 820.

Greater detail may be added to the map by the steps of displaying a distribution unit of the irrigation zone on the map 822, assigning a type and capability value to the distribution unit 824, determining a soil type of the irrigation zone 826, and storing the soil type in the memory device 828. Furthermore, the method may include the steps of determining a microclimate for the irrigation zone 830 and assigning a unique indicator to indicate the area of the microclimate on the map 832.

To determine the irrigation schedule for the irrigation zone, the method may include the steps of using a sensor to determine the amount of water distributed to the irrigation zone over time 834 and determining a desired water coverage of an irrigation zone 836, which may be determined from the soil, plant, and microclimate information. Then the method uses the information in the step of determining the irrigation schedule for the irrigation zone 838. Once the irrigation schedule for the irrigation zone is complete, the last step may be closing the setup module on the timer 840 or downloading the map from the computer to the timer 842.

Once the map is completed, the map may be downloaded from a computer to a memory device of the timer. A computer may be the user's computer or a kiosk at a store.

Figure 11:
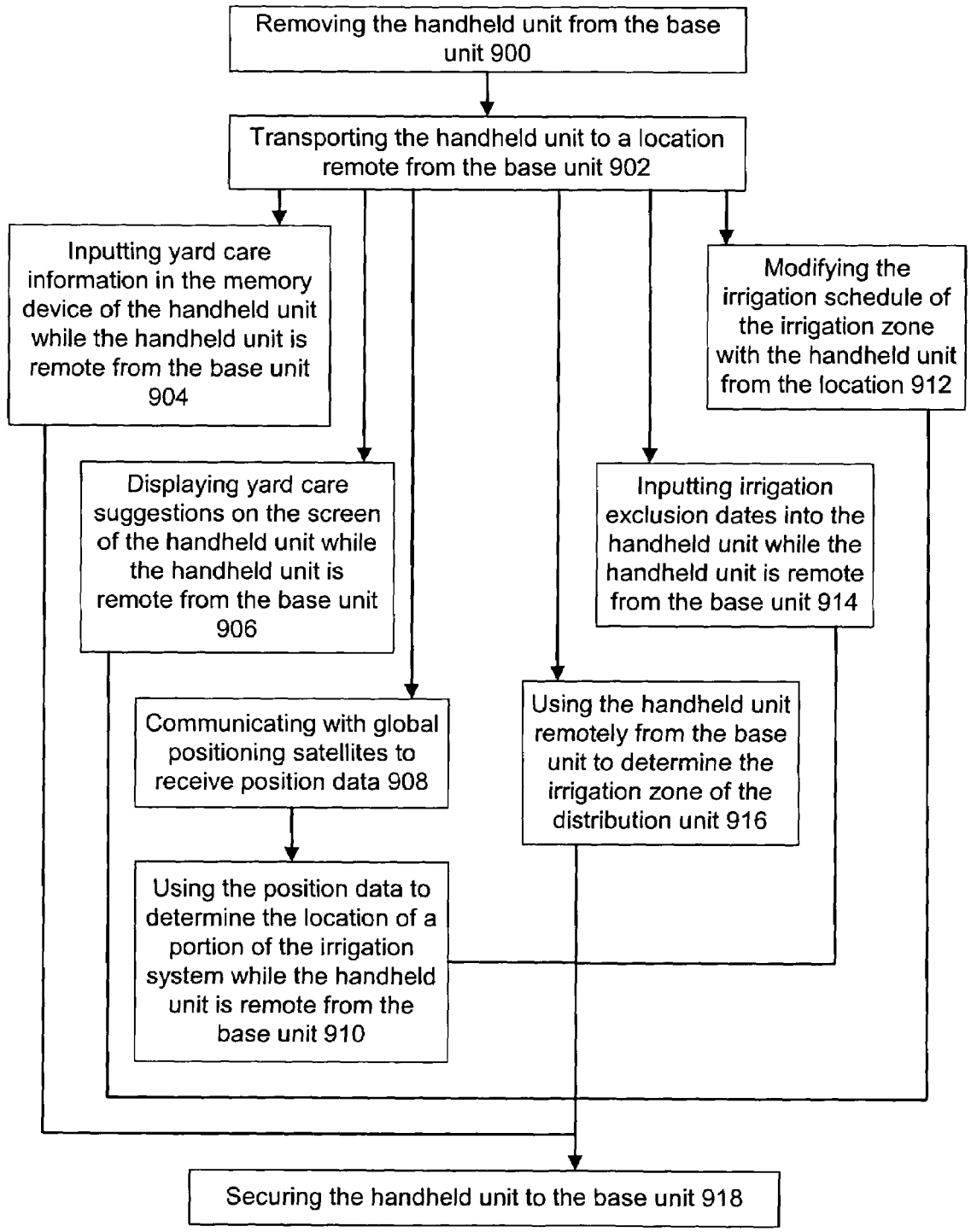
FIG. 11 is a flow chart illustrating a method of using a timer that includes a base unit and a handheld unit.

Referring to FIG. 11, a flow chart illustrates a method of using a timer that includes a base unit and a handheld unit. The method may include the steps of removing the handheld unit from the base unit 900 and transporting the handheld unit to a location remote from the base unit 902.

While the handheld unit is remote from the base unit, the method may include the steps of inputting yard care information in the memory device of the handheld unit while the handheld unit is remote from the base unit 904 or displaying yard care suggestions on the screen of the handheld unit while the handheld unit is remote from the base unit 906. Alternatively, the method may include the steps of communicating with global positioning satellites to receive position data 908 and using the position data to determine the location of a portion of the irrigation system while the handheld unit is remote from the base unit 910.

The method may also include the steps of modifying the irrigation schedule of the irrigation zone with the handheld unit from the location 912, inputting irrigation exclusion dates into the handheld unit while the handheld unit is remote from the base unit 914, and using the handheld unit remotely from the base unit to determine the irrigation zone of the distribution unit 916. Lastly, the method may include the steps of securing the handheld to the base unit 918.

Figure 12:
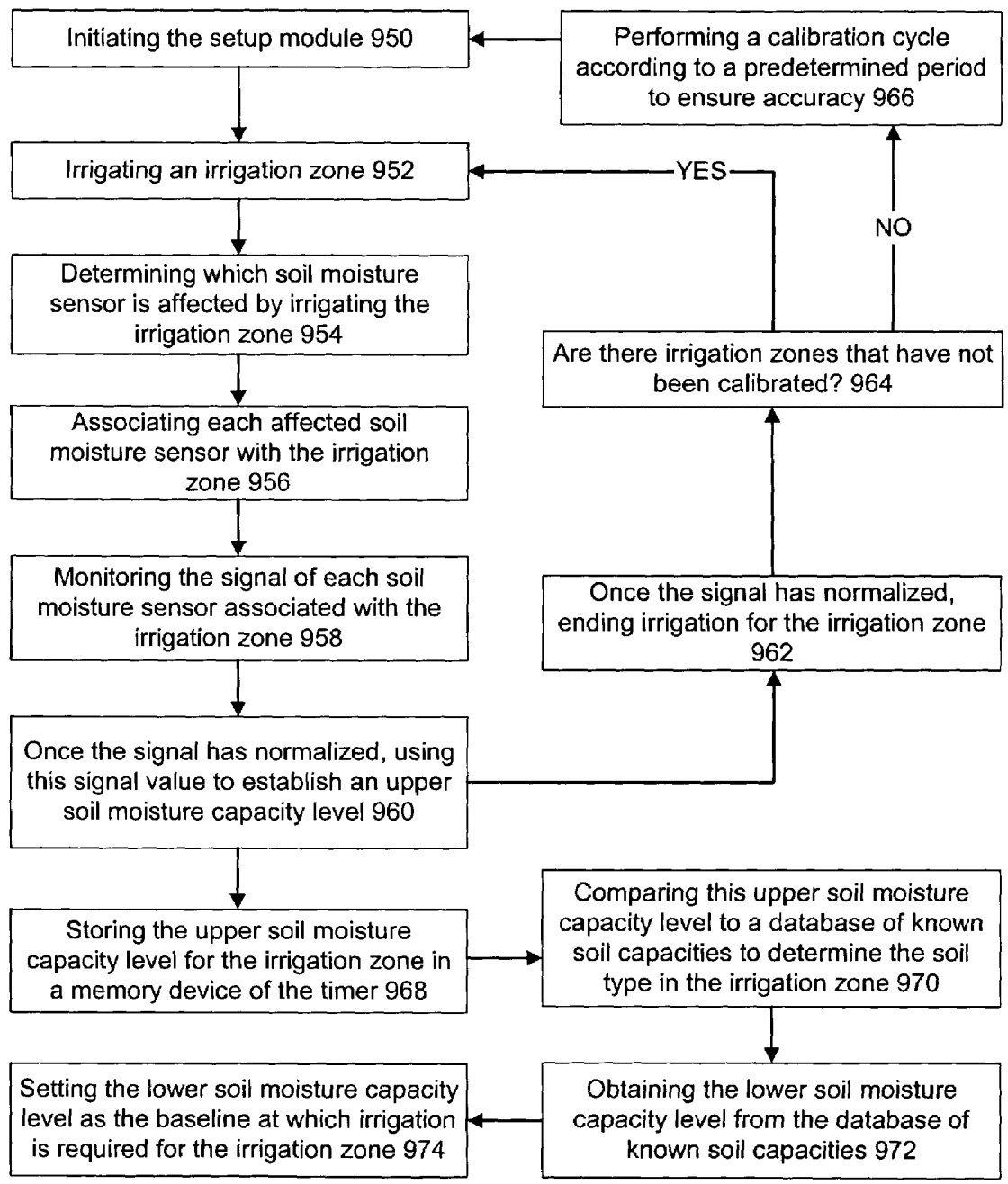
FIG. 12 is a flow chart illustrating a method of setting up a timer to automatically operate an irrigation system according to sensor data.

Referring to FIG. 12, a flow chart illustrates a method of setting up a timer to automatically operate an irrigation system according to sensor data. The timer of this method may be in communication with one or more soil moisture sensors that are each disposed within an irrigation zone of the property. The method may include the steps of initiating the setup module 950 of the timer, irrigating an irrigation zone 952, and determining which soil moisture sensor is affected by irrigating the irrigation zone 954.

The method may also include the steps of associating each affected soil moisture sensor with the irrigation zone 956, monitoring the signal of each soil moisture sensor associated with the irrigation zone 958, and once the signal has normalized, using this signal value to establish an upper soil moisture capacity level 960 for the irrigation zone. Additionally, once the signal has normalized, the method includes the steps of ending irrigation for the irrigation zone 962. The term "normalized" refers to a state of the signal from the moisture sensor, where the signal is generally constant, which indicates that the soil around the moisture sensor has been saturated by the continuing irrigation of the irrigation zone.

The method may then proceed to the step of determining whether there are irrigation zones that have not been calibrated 964. If there is another irrigation zone that has not been calibrated, the method repeats steps 952–964, until the irrigation system has been completely calibrated. If not, the method may proceed to the step of performing a calibration cycle according to a predetermined period to ensure accuracy 966. The predetermined period may be once a month, once a year, or any other period desired by a user. Once the predetermined period has passed, the timer performs a calibration cycle beginning with step 950.

As noted above, for each calibration cycle of an irrigation zone an upper soil moisture capacity level 960 for the irrigation zone is established. The method includes the further steps of storing the upper soil moisture capacity level for the irrigation zone in a memory device of the timer 968, comparing this upper soil moisture capacity level to a database of known soil capacities to determine the soil type in the irrigation zone 970, and obtaining the lower soil moisture capacity level from the database of known soil capacities 972 that may be stored in the memory device of the timer or in an online database. The method uses the lower soil moisture capacity level in the step of setting the lower soil moisture capacity level as the baseline at which irrigation is required for the irrigation zone 974. Once set up, the timer uses the signal from the soil moisture sensor to operate the irrigation system as discussed with reference to FIG. 13.

Figure 13:
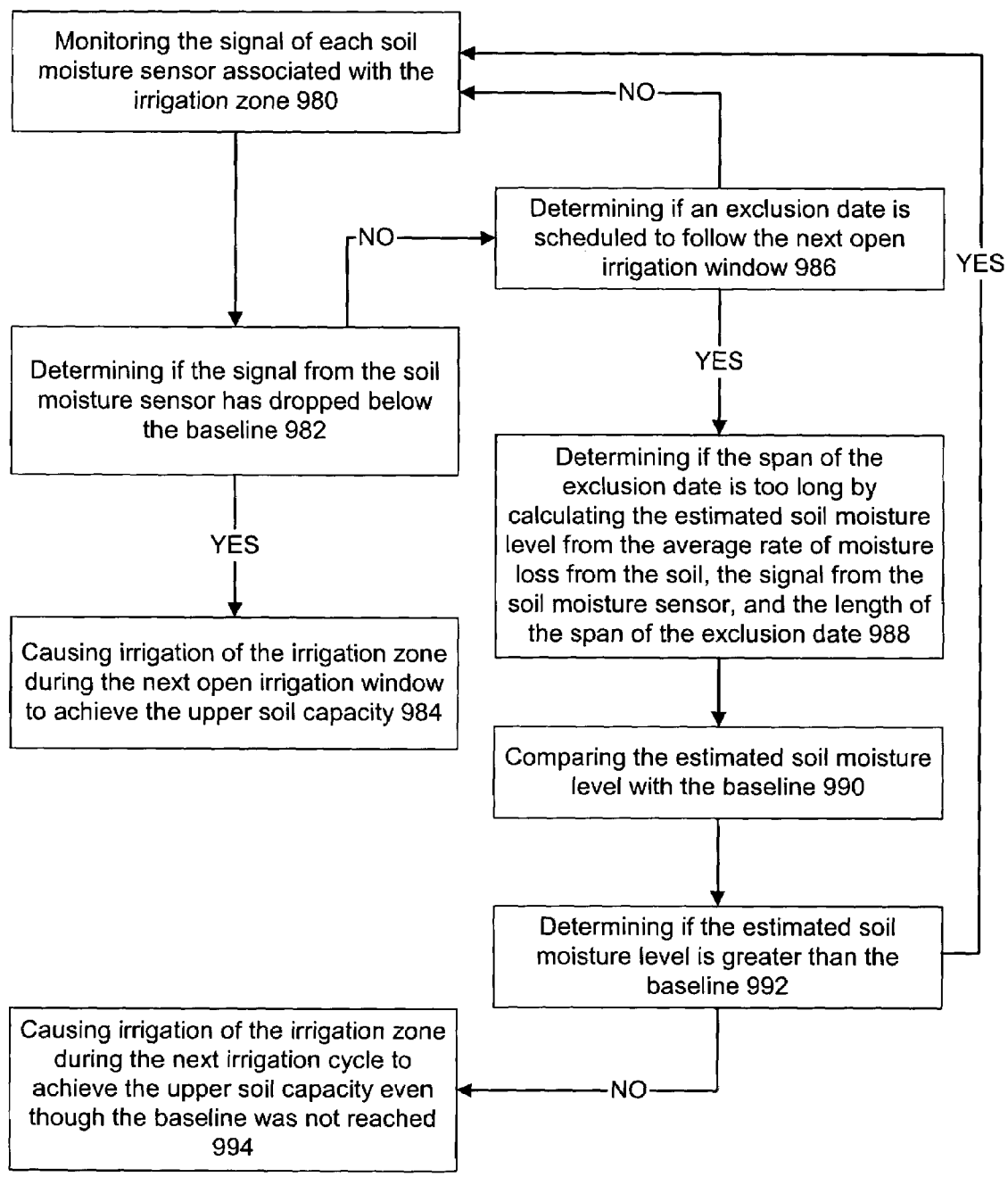
FIG. 13 is a flow chart illustrating a method of using a timer to automatically operate an irrigation system according to sensor data and to accommodate exclusion dates.

Referring to FIG. 13, a flow chart illustrates a method of using a timer to automatically operate an irrigation system according to sensor data and to accommodate exclusion dates. As noted above, timer is in communication with a soil moisture sensor disposed within the irrigation zone and the signal from the soil moisture sensor is used to schedule irrigation for the irrigation zone.

The method may include the steps of monitoring the signal of each soil moisture sensor associated with the irrigation zone 980 and determining if the signal from the soil moisture sensor has dropped below the baseline 982 that was set in step 974 of FIG. 12. If the signal from the soil moisture sensor has dropped below the baseline 982, the method includes the steps of causing irrigation of the irrigation zone during the next open irrigation window to achieve the upper soil capacity 984. If the signal from the soil moisture sensor has not dropped below the baseline 982, the method includes the step of determining if an exclusion date is scheduled to follow the next open 986. If not, the method returns to step 980 and continues monitoring the signal of each soil moisture sensor associated with the irrigation zone 980.

If an exclusion date is scheduled to follow the next open irrigation window 986, the method proceeds to the step of determining if the span of the exclusion date is too long by calculating the estimated soil moisture level from the average rate of moisture loss from the soil, the signal from the soil moisture sensor, and the length of the span of the exclusion date 988. The span of the exclusion date may be one or more days in length. The average rate of moisture loss from the soil may be determined from an average of the signal from the soil moisture sensor over a period of time between irrigation cycles of the irrigation zone or from the database of known soil capacities, using the soil type determined in step 970 of FIG. 12.

The method may include the steps of comparing the estimated soil moisture level with the baseline 990 and determining if the estimated soil moisture level is greater than the baseline 992. If the estimated soil moisture level is greater than the baseline 992, the method returns to step 980 and continues monitoring the signal of each soil moisture sensor associated with the irrigation zone 980. If not, the method proceeds to cause irrigation of the irrigation zone during the next irrigation cycle to achieve the upper soil capacity even though the baseline was not reached 994.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method for setting up a timer to control the operation of an irrigation system on a property, the timer comprising a CPU, memory device, and software stored in the memory device, the irrigation system comprising a valve, a conduit, and a distribution unit, wherein the distribution unit distributes fluid over an irrigation zone of the property, wherein the timer is in communication with a soil moisture sensor disposed within the irrigation zone, the method comprising:
   irrigating an irrigation zone;
   after irrigating the irrigation zone, automatically associating the affected soil moisture sensor with the irrigation zone, wherein the affected soil moisture sensor is not associated with the irrigation zone before irrigating the irrigation zone;
   monitoring the signal of the soil moisture sensor associated with the irrigation zone; and
   ending irrigation for the irrigation zone.

2. The method of claim 1, further comprising the steps of using a normalized signal value of the soil moisture sensor to establish an upper soil moisture capacity level and storing the upper soil moisture capacity level for the irrigation zone in the memory device of the timer.

3. The method of claim 2, further comprising the step of comparing the upper soil moisture capacity level to a database of known soil capacities to determine a soil type in the irrigation zone.

4. The method of claim 3, further comprising the steps of obtaining the lower soil moisture capacity level from the database of known soil capacities and setting the lower soil moisture capacity level as the baseline at which irrigation is required for the irrigation zone.

5. The method of claim 1, wherein the timer is in communication with a plurality of soil moisture sensors and the property includes a plurality of irrigation zones, wherein each soil moisture sensor is disposed within an irrigation zone, the method further comprising the step of determining which soil moisture sensor is affected by the irrigation zone being irrigated.

6. A method for using a timer to control the operation of an irrigation system on a property, the timer comprising a CPU, memory device, and software stored in the memory device, the irrigation system comprising a valve, a conduit, and a distribution unit, wherein the distribution unit distributes fluid over an irrigation zone of the property, wherein the timer is in communication with a soil moisture sensor disposed within the irrigation zone, wherein a baseline for the soil moisture sensor is stored in the memory device of the timer, the method comprising:
   monitoring a signal of the soil moisture sensor associated with the irrigation zone;
   determining whether the signal from the soil moisture sensor has not dropped below the baseline;
   determining that an exclusion time is scheduled to follow a next open irrigation window;
   determining that a span of the exclusion time is too long by calculating the estimated soil moisture level at the end of the exclusion time from the average rate of moisture loss from a soil type of the irrigation zone, the signal from the soil moisture sensor, and the length of the span of the exclusion time and by comparing the estimated soil moisture level with the baseline; and
   causing irrigation of the irrigation zone during the next open irrigation window to achieve an upper soil capacity even though the baseline has not yet been reached, if the estimated soil moisture level at the end of the exclusion time is less than the baseline.

* * * * *